United States Patent
Roberge

(10) Patent No.: US 9,918,433 B2
(45) Date of Patent: Mar. 20, 2018

(54) CONTINUOUS HARVESTER AND MOBILE WRAPPING SYSTEMS AND METHODS OF USING THE SAME

(71) Applicant: CNH Industrial Canada, LTD., Saskatoon (CA)

(72) Inventor: Martin J. Roberge, Saskatoon (CA)

(73) Assignee: CNH Industrial Canada, LTD., Saskatchewan (CA)

(*) Notice: Subject to any disclaimer, the term of this patent is extended or adjusted under 35 U.S.C. 154(b) by 921 days.

(21) Appl. No.: 14/316,209

(22) Filed: Jun. 26, 2014

(65) Prior Publication Data

US 2015/0373916 A1    Dec. 31, 2015

(51) Int. Cl.
*A01F 15/07* (2006.01)

(52) U.S. Cl.
CPC ...... *A01F 15/0705* (2013.01); *A01F 15/0715* (2013.01)

(58) Field of Classification Search
CPC . A01D 39/005; A01D 43/006; A01F 15/0705; A01F 15/07; A01F 15/0883; A01F 15/08; A01F 15/071; A01F 2015/077; A01F 2015/078; A01F 2015/0775; A01F 15/0715
USPC .......... 56/341, 343; 100/40, 43, 76, 88, 102; 460/59, 112, 117
See application file for complete search history.

(56) References Cited

U.S. PATENT DOCUMENTS

| | | | |
|---|---|---|---|
| 4,011,711 A | 3/1977 | Mast | |
| 4,045,947 A | 9/1977 | Mast | |
| 4,517,891 A | 5/1985 | Henry | |
| 4,534,285 A * | 8/1985 | Underhill | A01F 15/0705 100/88 |
| 4,667,592 A | 5/1987 | Pentith et al. | |
| 4,914,900 A * | 4/1990 | Viaud | A01F 15/0705 100/88 |
| 5,136,831 A * | 8/1992 | Fell | A01F 15/0705 100/88 |
| 6,467,237 B2 | 10/2002 | Viaud | |
| 6,729,118 B2 | 5/2004 | Viaud | |
| 8,091,326 B2 | 1/2012 | McHale et al. | |
| 9,055,716 B2 | 6/2015 | Roberge | |
| 2014/0165856 A1 | 6/2014 | Varley | |

FOREIGN PATENT DOCUMENTS

| | | |
|---|---|---|
| DE | 3415310 | 10/1985 |
| EP | 64117 | 11/1982 |
| EP | 0254337 A1 | 1/1988 |

* cited by examiner

*Primary Examiner* — Robert E Pezzuto
(74) *Attorney, Agent, or Firm* — Patrick M. Sheldrake

(57) ABSTRACT

A crop harvesting system for continuous round baling includes a first and second bale chamber, a conveyor system and optionally a wrapping system. At least one conveyor system can facilitate movement of a bale from a first bale chamber to a second bale chamber. The crop harvesting system can be integrated into an agricultural harvester such as a baler or combine.

15 Claims, 15 Drawing Sheets

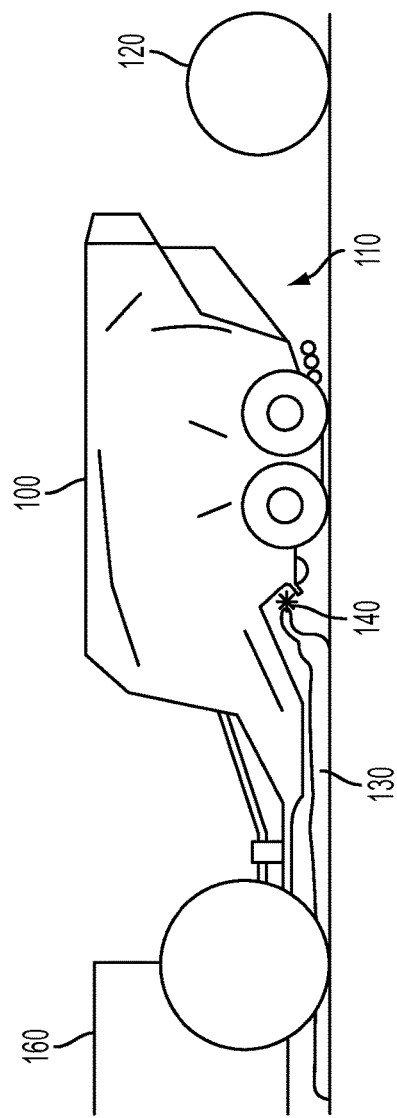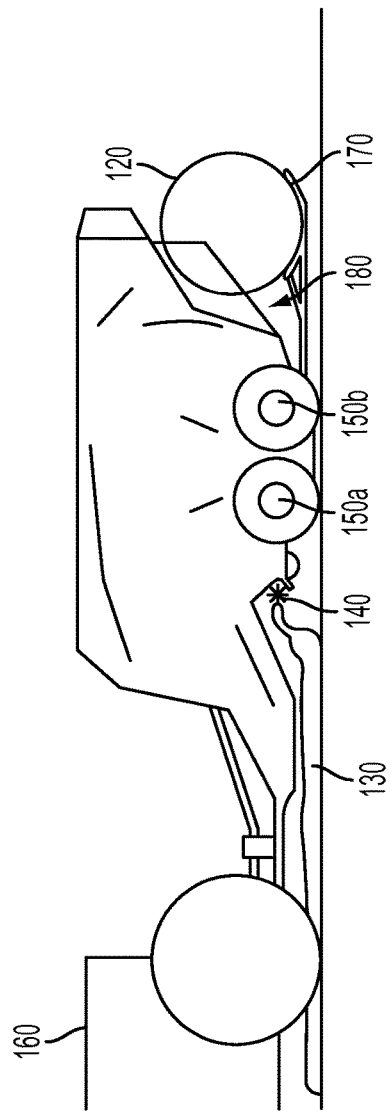

CONTINUOUS HARVESTER AND MOBILE WRAPPING SYSTEMS AND METHODS OF USING THE SAME

TECHNOLOGY FIELD

The disclosure relates to a crop harvesting system for a harvester that comprises two bale chambers operably connected by a conveyor system and, optionally, a wrapping system. The conveyor system, and, optionally, the wrapping system, facilitates movement of a bale from a first bale chamber to a second bale chamber. The crop harvesting system can be integrated into agricultural harvesters such as balers, combines, cotton pickers, or biomass harvesters.

BACKGROUND

For many years agricultural balers have been used to consolidate and package crop material so as to facilitate the storage and handling of the crop material for later use. A mower-conditioner typically cuts and conditions the crop material for windrow drying in the sun. When the cut crop material is properly dried, an agricultural harvester, such as a round baler, operates over the windrows to pick up the crop material and form the crop material into cylindrically-shaped round bales. Other agricultural harvesters, such as those harvesters used for biomass collection, use direct feed mechanisms that cut, collect, and bale material into a round bale in sequential steps.

The pickup of the baler gathers the cut and windrowed crop material from the ground then convey the cut crop material into a bale-forming chamber within the baler. A drive mechanism operates to activate the pickup, auger, and a rotor of the feed mechanism. A conventional baling chamber may consist of a pair of opposing sidewalls with a series of belts that rotate and compress the crop material into a cylindrical shape.

When the bale has achieved a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

The tailgate of the baler typically houses a simple door or panel that is affixed to the tailgate by hinges. In one position, the door or panel remains closed to prevent escape of the harvested bale. In another position, the door or panel can be placed in an open position to facilitate the exit of the harvested bale. Conventional balers require a relatively long period of downtime, typically in the range of between 10 and 15 seconds, to open the door or panel during operation and evacuation of the bale. The downtime required to operate the door reduces the overall efficiency of the harvesting system and interrupts continuous harvesting. The simple door or panel mechanism typically operates very slowly in a manual or automatic fashion. Once fully open the weight of the door or panel is typically very heavy, which affects the center of gravity of the equipment, puts additive stress on the tension points, and may cause instability problems if the agricultural harvester is on a hill or slope.

Modified balers have been designed to address delays caused by ejection. EP 2 220 929 discloses a round baler with a bale chamber and a storage chamber. Bales are condensed and wrapped in the bale chamber, and a fully-formed bale may be stored in and eventually ejected from the storage chamber while harvesting continues to take place in the bale chamber. A harvesting assembly centrally located on the bottom of the harvester routes harvested crop to one of the two chambers. The harvesting assembly in conjunction with an internal series of rollers between the two chambers routes harvested crop through a curved passage that back-feeds the bale chamber on a single moveable roller. A limitation of this design is the multiple directions toward which the harvested crop must be fed from the harvesting assembly causing a greater likelihood of clogging the entry point of the bale chamber. The likelihood of clogging the passage with crop also increases with the work of the back-feed mechanism being completed by a single roller. Another problem is the conventional means to eject the bale from the harvester.

U.S. Pat. No. 6,729,118 discloses another modified baler for harvesting in which three movable arms in operable connection to movable rollers. The moveable arms rotate about the same axis in a windmill-like fashion within the interior of the baler. A pick-up assembly directs crop to only one bale chamber entry point and the windmill-like motion of the arms conveys a bale to a second position within the harvester immediately prior to ejection. This design allows for fewer rollers in the interior of the harvester which are necessary to transfer a partially formed bale to a second position while bale formation occurs near the bale chamber entry point. A potential problem with the design is the control of the independent movement of the arms which may increase operator error during operation. Another limitation of the design is the increased likelihood of silage pile-up and plugging of bale chamber due to a lack of sufficient tension around the bale chamber due to a long belt and long belt pathway. This problem is likely exacerbated by the movable roller mechanically linked to a spring at the front end of the baler. Increased silage and harvested crop pile-up toward the front of the baler may contribute to the bale not forming properly while the baler is in operation due to the lack of tension on the bales caused by the movable roller and its related spring-loaded apparatus.

In some previous designs, for instance U.S. patent application Ser. No. 13/472,266, a conveyor between two bale chambers facilitated movement, however, this design relied solely upon gravity and the downward pitch of the conveyor to transfer a formed bale from one position to another position prior to its evacuation. The instantly disclosed design of the harvester increases the speed with which a harvester comprising a baling mechanism moves a bale from a bale chamber to a second position from which the bale will exit the harvester. Instead of relying solely on the passive nature of the angle of a bottom conveyor and gravity to transfer the bale, the current design includes a bottom conveyor with baling belts that assume a variable geometry during different stages of operations that coordinate faster, controlled movement of the baling belts from one position to a position immediately prior to exit or evacuation from the harvester. The instantly disclosed design also preserves the shape of the bale during transition from a first position to a second position by exacting tension on the bale at appropriate points of the bale during transfer. By correcting the shape of the bale, the instantly disclosed design improves bale density over prior designs during transition from a first position to a second position. Lastly, the design shortens the transfer time of the bale from the first bale chamber during transition.

SUMMARY

The disclosure relates to a conveyor system comprising: a pair of parallel positioned and oppositely facing sidewalls; a plurality of rolls positioned between the sidewalls around which one or a plurality of baling belts are operably rotating and capable of endless rotation; and a first bale gate comprising: at least one arm element operably connected to at least one of the plurality of rolls, the arm element mounted on at least one sidewall about at least one pivot point, the at least one arm element exacts tension on the one or plurality of baling belts; wherein at least one length of the arm element is capable of radial movement from a lowered position to one or a plurality of raised positions; wherein the first bale gate is configured for operation proximate to or partially within one or more bale chambers and wherein the radial movement facilitates transfer of a bale across at least a portion of the baling belts; wherein the plurality of rolls comprise at least one set of movable rolls and at least one set of drive rolls; wherein the movable rolls are movable in a frontward and rearward direction; wherein the drive rolls drive direction and movement of the one or plurality of baling belts; and wherein the plurality of rolls are capable of exacting tension in the baling belts in conjunction with the first bale gate.

In some embodiments the conveyor system further comprises a first bale chamber and a second bale chamber wherein at least a plurality of the baling belts are positioned between the sidewalls and between the first and second bale chambers.

In some embodiments, the first bale gate comprises: a first pair of arm elements extending transversely from and fixed to a first pair of pivot points on the parallel positioned and oppositely facing sidewalls; optionally, a second pair of arm elements extending transversely from and fixed to a second pair of pivot points on the parallel positioned and oppositely facing sidewalls; at least one pair of fixed members positioned at a distance defined by the length of the first and second pair of arms; and at least one pair of parallel bars fixed to the one or more fixed members.

In some embodiments, the first bale gate is stationary in the lowered position; wherein, in one or a plurality of raised positions the first bale gate pivots upward and prevents entry of a bale into the second bale chamber from the first bale chamber, wherein the first bale gate is operably synchronized with the transfer of a bale from at least one bale chamber such that: in the lowered position the at least one of the plurality of rolls operably connected to the first bale gate is in its fully stationary position; in at least a first raised position, the at least one arm element pivots upward with the at least one or a plurality of rolls and prevents entry of a bale into the second bale chamber from the first bale chamber; and in at least a second raised position, the at least one arm element pivots downward with the at least one or a plurality of rolls and allows entry of the bale into the second bale chamber.

In some embodiments, the conveyor system further comprises a slack adjustment system comprising a pair of movable rolls operably connected to a pair of members affixed to the movable rolls; wherein one or more raised positions, the movable rolls move in a frontward or rearward motion to pick up or release slack in the one or plurality of baling belts.

In some embodiments, the lowered position and the one or a plurality of raised positions of the first bale gate independently define a series of operable conditions of the conveyor system, wherein: a first operable condition comprises the lowered position, whereby the first bale gate is in a stationary position distal to the second bale chamber; a second operable condition comprises a first raised position whereby the at least one arm element is in its fully open position and occludes an inlet to the second bale chamber; and a third operable condition comprises a second raised position whereby at least one arm element follows a radial path around at least one pivot point between the lowered position and the first raised positions, wherein the at least one arm element exposes the entry of the second bale chamber and allows transfer of a bale into the second bale chamber.

The present disclosure also provides wrapping systems comprising: a pair of parallel positioned and oppositely facing sidewalls; a plurality of rolls positioned between the sidewalls and operably connected to a subframe; at least one supporting arm operably connected to the subframe by at least one flexible point, the supporting arm radially mounted on at least one sidewall about at least one pivot point; wherein at least one length of the supporting arm and the subframe are capable of radial movement about the at least one pivot point from a wrapping position to one or a plurality of raised positions; wherein the plurality of rolls comprises at least one belt roll, around which one or a plurality of baling belts are operably rotating and capable of endless rotation; wherein the at least one belt rolls are capable of exacting tension in the baling belts; wherein the radial movement facilitates transfer of a bale from a bale chamber.

In some embodiments, the plurality of rolls comprises at least a first and at least a second belt rolls, wherein the at least a first belt roll is operably connected to a first serpentine system, wherein the at least a second belt roll is operably connected to a second serpentine system, wherein the at least a first and at least a second belt rolls operably connect the first and second serpentine systems. In some embodiments, the plurality of rolls comprise at least one bale compression roll configured for contacting and exacting pressure on a bale when the bale is in a bale chamber adjacent to the at least one bale compression roll; and wherein the wrapping system is configured for operation proximate to or partially within one or more bale chambers.

In some embodiments, the subframe defines a compartment configured for containing a wrapping mechanism; wherein the wrapping mechanism dispenses wrapping material from the subframe, around the at least one bale compression roll, and optionally onto a bale; and wherein the wrapping mechanism is configured to dispense wrapping material when the subframe is in the wrapping position.

In some embodiments, the subframe is operably synchronized with the transfer of a bale from the bale chamber such that: in the wrapping position the subframe is in its maximally downward position, preventing the transfer of the bale from the bale chamber and optionally wrapping the bale; in at least a first raised position, the subframe moves forward and upward from the wrapping position, allowing the transfer of the bale from the bale chamber; and in at least a second raised position, the subframe moves rearward and downward from the at least a first raised position, to assist in the transfer of the bale from the bale chamber.

In some embodiments, the wrapping position and the one or a plurality of raised positions of the subframe optionally and independently define a series of operable conditions of the wrapping system, wherein: a first operable condition comprises the wrapping position, whereby the wrapping system fully occludes the exit of the bale chamber; a second operable condition comprises a first raised position, whereby the wrapping system does not occlude the exit of the bale chamber; and a third operable condition comprises a second raised positions, whereby the subframe follows a radial path around at least around at least one pivot point between the wrapping position and the first raised position, wherein the subframe partially occludes the exit of the bale chamber, and optionally assists the transfer of a bale exiting from the bale chamber.

The present disclosure also provides a harvester comprising: a first bale chamber and a second bale chamber, operably coupled by a conveyor system comprising: a pair of parallel positioned and oppositely facing sidewalls; a plurality of rolls positioned between the sidewalls around which one or a plurality of baling belts are operably rotating and capable of endless rotation; and a first bale gate comprising: at least one arm element operably connected to at least one of the plurality of rolls, the arm element mounted on at least one sidewall about at least one pivot point, the at least one arm element exacts tension on the one or plurality of baling belts; wherein at least one length of the arm element is capable of radial movement from a lowered position to one or a plurality of raised positions; wherein the first bale gate is configured for operation proximate to or partially within one or more bale chambers and wherein the radial movement facilitates transfer of a bale across at least a portion of the baling belts; wherein the plurality of rolls comprise at least one set of movable rolls and at least one set of drive rolls; wherein the movable rolls are movable in a frontward and rearward direction; wherein the drive rolls drive direction and movement of the one or plurality of baling belts; and wherein the plurality of rolls are capable of exacting tension in the baling belts in conjunction with the first bale gate; wherein the first bale chamber is positioned at a front end of the harvester and the second bale chamber is positioned behind the first bale chamber with the conveyor system positioned therebetween; wherein each of the first and second bale chambers comprise: a first sidewall and a second sidewall, an entry point at the front of the first and second bale chambers into which crop material flows; an outlet at a rear of the first and second bale chambers, and at least one floor roller positioned at a bottom of each of the bale chambers transverse to the first and second sidewalls; and wherein at least one roll of the conveyor system defines a bottom portion of the first bale chamber.

In some embodiments, the harvester further comprises a harvesting assembly positioned at the front end of the harvester and operably connected to the first bale chamber; a first serpentine system arranged for the first bale chamber, the first serpentine system comprising: a second bale gate positioned in the first bale chamber, the second bale gate comprising at least one arm element and at least one roll attached thereto; wherein the at least one arm element is mounted on at least one sidewall about at least one pivot point; wherein the second bale gate exacts tension on the one or plurality of baling belts; wherein the second bale gate is capable of radial movement from a closed position to one or a plurality of open positions; and wherein the radial movement facilitates the transfer of a bale from the first bale chamber into the second bale chamber; one or more baling belts in operable contact with the at least one roll of the second bale gate and a plurality of stationary rollers, around which the one or more baling belts are capable of endless rotation; and a second serpentine system arranged for the second bale chamber, the second serpentine system comprising: a third bale gate positioned at the outlet of the second bale chamber, the third bale gate comprising at least one pair of arms, at least one pair of fixed members operably connected to the at least one pair of arms, and at least two movable rollers; wherein the at least one pair of arms is mounted on at least one sidewall about at least two pivot points; wherein the third bale gate exacts tension on the one or plurality of baling belts; wherein the third bale gate is capable of radial movement from a closed position to one or a plurality of open positions; and wherein the radial movement facilitates the ejection of a bale from the second bale chamber; one or more baling belts in operable contact with the at least two movable rollers of the third bale gate and a plurality of stationary rollers, around which the one or more baling belts are capable of endless rotation.

In some embodiments, the harvester further comprises a first slack adjustment system positioned at the front of the first bale chamber, the first slack adjustment system comprising at least one pair of arms and at least one movable roll attached thereto; wherein the at least one pair of arms extends upwardly from and affixed to at least one sidewall; wherein the at least one movable roll is capable of sliding from a first position to a second position is order to take up or release slack in the one or plurality of baling belts in the first serpentine system; and a second slack adjustment system positioned at the rear of the second bale chamber, the second slack adjustment system comprising at least one pair of arms and at least one movable roll attached thereto; wherein the at least one pair of arms extends upwardly from and affixed to at least one sidewall; wherein the at least one movable roll is capable of sliding from a first position to a second position in order to take up or release slack in the one or plurality of baling belts in the second serpentine system.

In some embodiments, the second bale gate is operably synchronized with the transfer of a bale from the first bale chamber to the second bale chamber such that: in the closed position the at least one roll of the second bale gate is in its maximally downward position, preventing the exit of a bale from the first bale chamber; in at least a first open position, the at least one roll of the second bale gate pivots upward and rearward, allowing a bale in the first bale chamber to transfer into the second bale chamber; and in at least a second open position, the at least one roll of the second bale gate pivots downward and frontward, allowing crop material to transfer from the first bale chamber into the second bale chamber, but preventing the exit of a bale from the first bale chamber. In some embodiments, the third bale gate is operably synchronized with the transfer of a bale from the first bale chamber to the second bale chamber such that the at least two movable rolls of the third bale gate slides upward prior to the ejection of a bale from the second bale chamber.

In some embodiments, the harvester further comprises at least a first, second, third and fourth operable conditions, wherein: the first operable condition comprises the second bale gate in a closed position, and the third bale gate in a closed position, wherein the second bale gate in the closed position facilitates formation of harvested crop material into a bale of a predetermined size, wherein the third bale gate in the fully closed position allows second bale to exist in the second bale chamber; the second operable condition comprises the second bale gate in an open position, and the first bale gate in a raised position, wherein the second bale gate in an open position, and the first bale gate in the raised position allow for the transfer of a bale from the first bale chamber to the second bale chamber; the third operable condition comprises the second bale gate in an open position, the first bale gate in a lowered position, and the third bale gate in a closed position, wherein the second bale gate in the open position, the first bale gate in the lowered position, and the third bale gate in the closed position allow for crop to be transferred from the harvesting assembly, through the first bale chamber, and into the second bale chamber; the fourth operable condition comprises the third bale gate in an open position, wherein the third bale gate in the open position allow for the evacuation of a bale from the harvester.

In some embodiments, the harvester further comprises a wrapping system comprising: a plurality of rolls positioned between the sidewalls and operably connected to a subframe; at least one supporting arm operably connected to the subframe by at least one flexible point, the supporting arm radially mounted on at least one sidewall about at least one pivot point; wherein at least one length of the supporting arm and the subframe are capable of radial movement about the at least one pivot point from a wrapping position to one or a plurality of raised positions; wherein the plurality of rolls comprises at least one belt roll, around which one or a plurality of baling belts are operably rotating and capable of endless rotation; wherein the at least one belt rolls are capable of exacting tension in the baling belts; wherein the radial movement facilitates transfer of a bale from a bale chamber.

The present disclosure also provides a harvester comprising: a first bale chamber and a second bale chamber, operably coupled by a wrapping system comprising: a pair of parallel positioned and oppositely facing sidewalls; a plurality of rolls positioned between the sidewalls and operably connected to a subframe; at least one supporting arm operably connected to the subframe by at least one flexible point, the supporting arm radially mounted on at least one sidewall about at least one pivot point; wherein at least one length of the supporting arm and the subframe are capable of radial movement about the at least one pivot point from a wrapping position to one or a plurality of raised positions; wherein the plurality of rolls comprises at least one belt roll, around which one or a plurality of baling belts are operably rotating and capable of endless rotation; wherein the at least one belt rolls are capable of exacting tension in the baling belts; wherein the radial movement facilitates transfer of a bale from a bale chamber; wherein the first bale chamber is positioned at a front end of the harvester and the second bale chamber is positioned behind the first bale chamber with the wrapping system positioned therebetween; wherein each of the first and second bale chambers comprise: a first sidewall and a second sidewall, an entry point at the front of the first and second bale chambers into which crop material flows, an outlet at a rear of the first and second bale chambers, and at least one floor roller positioned at a bottom of each of the bale chambers transverse to the first and second sidewalls.

In some embodiments, the harvester further comprises at least a first, second, third and fourth operable conditions, wherein: the first operable condition comprises the second bale gate in a closed position, the wrapping system in a wrapping position, and the third bale gate in a closed position, wherein the second bale gate in the closed position facilitates formation of harvested crop material into a bale of a predetermined size, wherein the wrapping system in the wrapping position and the third bale gate in the fully closed position allows second bale to exist in the second bale chamber; the second operable condition comprises the second bale gate in an open position, and the wrapping system in a raised position, wherein the second bale gate in an open position, and the wrapping system in the raised position allow for the transfer of a bale from the first bale chamber to the second bale chamber; the third operable condition comprises the second bale gate in an open position, the wrapping system in a wrapping position, and the third bale gate in a closed position, wherein the second bale gate in the open position, the wrapping system in the wrapping position, and the third bale gate in the closed position allow for crop to be transferred from the harvesting assembly, through the first bale chamber, and into the second bale chamber; the fourth operable condition comprises the wrapping system in the wrapping position and the third bale gate in an open position, wherein the wrapping system in the wrapping position and the third bale gate in the open position allow for the evacuation of a bale from the harvester.

In some embodiments the harvester further comprises a conveyor system comprising: a plurality of rolls positioned between the sidewalls around which one or a plurality of baling belts are operably rotating and capable of endless rotation; and a first bale gate comprising: at least one arm element operably connected to at least one of the plurality of rolls, the arm element mounted on at least one sidewall about at least one pivot point, the at least one arm element exacts tension on the one or plurality of baling belts; wherein at least one length of the arm element is capable of radial movement from a lowered position to one or a plurality of reaised positions; wherein the first bale gate is configured for operation proximate to or partially within one or more bale chambers and wherein the radial movement facilitates transfer of a bale across at least a portion of the baling belts; wherein the plurality of rolls comprise at least one set of movable rolls and at least one set of drive rolls; wherein the movable rolls are movable in a frontward and rearward direction; wherein the drive rolls drive direction and movement of the one or plurality of baling belts; and wherein the plurality of rolls are capable of exacting tension in the baling belts in conjunction with the first bale gate;

The present disclosure also provides a harvester comprising at least a first, second, third and fourth operable conditions, wherein: the first operable condition comprises the second bale gate in a closed position, the wrapping system in a wrapping position, and the third bale gate in a closed position, wherein the second bale gate in the closed position facilitates formation of harvested crop material into a bale of a predetermined size, wherein the wrapping system in the wrapping position and the third bale gate in the fully closed position allows second bale to exist in the second bale chamber; the second operable condition comprises the second bale gate in an open position, the first bale gate in the raised position, and the wrapping system in a raised position, wherein the second bale gate in an open position, the first bale gate in the raised position, and the wrapping system in the raised position allow for the transfer of a bale from the first bale chamber to the second bale chamber; the third operable condition comprises the second bale gate in an open position, the first bale gate in the lowered position the wrapping system in a wrapping position, and the third bale gate in a closed position, wherein the second bale gate in the open position, the first bale gate in the lowered position, the wrapping system in the wrapping position, and the third bale gate in the closed position allow for crop to be transferred from the harvesting assembly, through the first bale chamber, and into the second bale chamber; the fourth operable condition comprises the wrapping system in the wrapping position and the third bale gate in an open position, wherein the wrapping system in the wrapping position and the third bale gate in the open position allow for the evacuation of a bale from the harvester.

In some embodiments, the harvester comprises a first sensor positioned in the first bale chamber and a second sensor positioned in the second bale chamber, wherein the first and second sensors are in operable communication with a controller system and detect the diameter of a bale in the first and second bale chambers.

The present disclosure also provides methods of harvesting material in a harvester, said method comprising: (a) feeding material from a harvesting assembly into the first bale chamber; (b) forming a bale in the first bale chamber to a desired size; (c) transferring the partially formed bale from the first bale chamber to the second bale chamber; (d) completing bale formation in the second bale chamber; (e) ejecting the complete bale from the second bale chamber contemporaneously with initiating step (a).

BRIEF DESCRIPTION OF THE DRAWINGS

FIG. 2A and 2B depict two exemplary embodiments of the continuous harevster.

DETAILED DESCRIPTION

Figure 1:
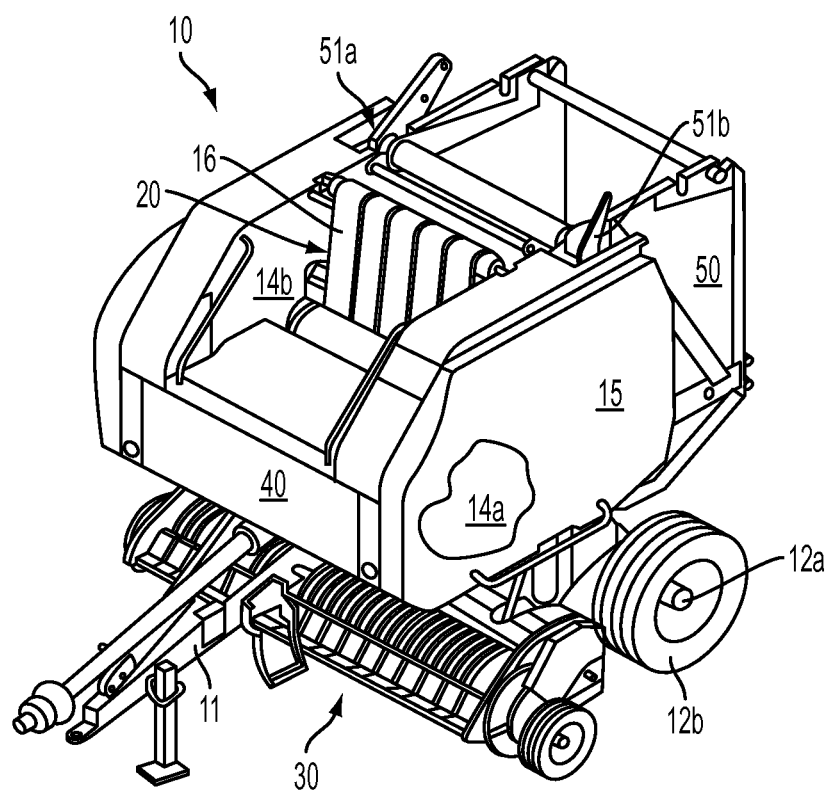
FIG. 1 depicts a static image of a traditional baler.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The term "harvester" as used herein is defined as a machine designed to consolidate and/or package material so as to facilitate the storage and handling of the material for later use. In some embodiments, the harvester is used to harvest agricultural material. In some embodiments, the harvester is an agricultural baler, a waste baler, or a combine comprising a baling mechanism.

The term "material" as used herein is defined as a numerous individual items that are harvested or collected by the harvester. In some embodiments, the material is agricultural crop, such as hay or cotton. In some embodiments, the material is biomass.

The term "harvesting assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683 A1 that illustrates such mechanisms, the disclosures of which are incorporated herein by reference in their entirety.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the third bale gate, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a third bale gate is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "bale gate" as used herein is defined as movable roll positioned between a harvester subframe and mechanically attached to at least one arm capable of movement within the harvester. In some embodiments the bale gate is a retractable mechanism that obstructs an entry or outlet of a bale chamber when the bale gate is in its fully closed position. In some embodiments, the bale gate is controlled by an operator, who through a controller, uncovers the entry or outlet points of the bale chamber when the bale is of a desired width, height and/or density. A type of bale gate known as a bale carrier is described in U.S. patent application Ser. No. 13/308,304, currently pending, which is incorporated herein by reference in its entirety. Controllers are generally known in the art and any controller for the agricultural harvester can be used independent of or in conjunction with a tractor controller. Examples of controllers are described in U.S. Pat. No. 7,640,721, which is incorporated herein by reference in its entirety. In some embodiments, one or more bale gates are movable among a closed position and one or more open positions. In some embodiments, at least a first bale fate is movable among a closed and at least one or a plurality of open positions and the at least one arm is capable of movement around a pivot point by at least one or a pair of arms that rotate when the bale gate is engaged or opened. In some embodiments, there is a first, a second, and a third bale gate. In some embodiments, the third bale gate comprises: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance defined by the length of the first and second pair of arms; and a pair of parallel affixed to the one or more fixed members; wherein the third bale gate uncovers the outlet at one end of the bale chamber through which the bale becomes ejected from the bale chamber when the third bale gate is raised upward from its closed position. In some embodiments, the third bale gate comprises a fourth roller contained within at least a first or second serpentine system and positioned above the first, second, and third rollers, wherein the fourth roller imparts tension in one or more baling belts when the at least one third bale gate is in its fully closed position. It is understood that a first or second serpentine system comprises one or more bale gates and the rollers that are contained within each bale gate.

In some embodiments, the harvester or system comprises one or a plurality of bale carriers or bale gates with at least two pairs of arms that pivot upward and downwards with at least two different pivot points. In some embodiments, the two pivot points rest on two different axes of rotation. If embodiments comprise bale carriers with at least two pairs of arms, in some embodiments, the length of one pair of arms is shorter than the other, and in such cases, upon opening or closing of the bale carrier or bale gate, the rate of speed of one pair of arms must be faster than the rate of speed of the other pair of arms, such that the shorter pair of arms does not interfere with the radial path of the longer pair of arms. If embodiments comprise bale carriers or bale gates with at least two pairs of arms, in some embodiments, the length of one pair of arms is shorter than the other, and in such cases, upon opening or closing of the bale carrier or bale gate, the rate of speed of one pair of arms must be faster than the rate of speed of the other pair of arms, such that no cross-over of the first or second pair of arms occurs upon movement of the bale carrier or bale gate along its radial path.

In some embodiments, the harvester comprises at least one, two, or three bale carriers or bale gates, wherein the at least the first, second, or third bale carriers or bale gates comprises an arm assembly comprising at least one pair of arms with a length that defines a radial path about a pivot point around an axis of rotation of such bale carrier or bale gate. In some embodiments, the arm assembly of such bale carriers or bale gates comprise a linkage to one or more pivot points on the sidewall of the harvester or system such that the arm assembly rotates about the pivot point. In some embodiments, the harvester or system comprises at least two arm assemblies with linkages to two different pivot points around which the bale carriers or bale gates rotatably pivot. As disclosed herein, if the bale carrier or bale gates comprises at least two arm assemblies with at least two pivot points, the arm assemblies may be two different lengths. Upon initiating movement or any opening or closing disclosed herein, the shorter length of one arm assembly will move faster than the longer arm assembly such that the two arm assemblies do not cross radial paths as the bale carrier or bale gate moves from one position to another position.

The term "serpentine system" as used herein is defined as one or a plurality of baling belts and a plurality of rollers, such rollers responsible for directing the path and exacting tension upon one or a plurality of baling belts, wherein the one or plurality of baling belts capable of forming bale in a bale chamber during the operation of the harvester. In some embodiments, the one or a plurality of baling belts rotate endlessly on the plurality of rollers.

The term "movable point of contact" as used herein is defined as a point of contact between one or a plurality of baling belts and a leading edge of a bale.

The term "wrapping mechanism" as used herein is defined as a mechanical device or assembly that dispenses wrapping material to wrap a formed bale. In some embodiments, the net wrapping mechanism comprises at least two material support cylinders, a mechanism support cylinder, a first and a second support plate, at least one drive mechanism, a pair of oppositely facing frame plates, a lock mechanism, a brake system, at least one feed roller, and a feed plate. In some embodiments, the material support cylinders, mechanism support cylinder, and the first and second support plate can revolve around a support axis. In some embodiments, wrapping material is passed around the at least one feed roller through the feed plate. In some embodiments, the wrapping mechanism is positioned within the interior of a harvester.

The term "wrapping material" as used herein is defined as a net, mesh, twine, plastic film, or other material that is used for the wrapping of a bale in order to maintain the shape and density of said bale and optionally protect it from weather or other external conditions after evacuation from a harvester.

The term "controller" as used herein is defined as a device that is operably connected to and commands another item, element, device, mechanism, or assembly and optionally provides information on the position, condition, or state of the commanded item, element, device, mechanism or assembly. In some embodiments, the controller is operably connected to a net wrapping mechanism. In some embodiments, the controller is operably connected to a net wrapping mechanism by at least one or a combination of a manual lever, and electrical component, and a hydraulic actuator. In some embodiments, the controller is able to control the position of the net wrapping mechanism. In some embodiments, the controller is in electronic communication with at least one sensor that provides feedback as to the position of the net wrapping mechanism within the subframe. In some embodiments, the controller provides warning signals to an operator if sensors in electronic communication with the controller identify that a position along the path of a bale is occluded or blocking the path of the bale. In some embodiments, the controller provides warning signals to an operator if sensors in electronic communication with the controller identify that one or more bale gates is not in a position that is synchronous with another bale gate or separate system such that the bale gate cannot facilitate the transfer of a bale from one position to a second position. In some embodiments, the controller is located on the side of a harvester.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural balers, such as round balers, are well known in the agricultural industry, and the instant disclosure can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entirety. Embodiments of the present disclosure are particularly well suited, but in no way limited to, use with agricultural balers. The present disclosure may also find utility in agricultural harvesters including, for example, a waste baler, a cotton harvester, or a combine. In some embodiments, the combine comprises a baling mechanism. In some embodiments, the present disclosure is related to embodiments disclosed in U.S. patent application Ser. No. 14/316,121, titled "REMOVABLE AND MOBILE NET WRAP SYSTEM", and 14/316,162, titled "CONTINUOUS ROUND BALER WITH VARIABLE CONVEYOR", filed together with the current disclosure on Jun. 26, 2014, which are incorporated herein by reference in their entirety.

The present disclosure relates to an agricultural harvester that comprises at least a first and a second bale chamber and one or a plurality of baling belts rotating endlessly on a plurality of rolls that facilitate the formation of a bale comprising crop material in the first bale chamber, and/or the transfer of the bale from the first bale chamber to the second bale chamber, and/or the ejection of the bale from the second bale chamber. In some embodiments, the harvester comprises a conveyor that facilitates movement of a bale from a first position within the harvester to a second position within the harvester. The conveyor comprises at least a first bale gate comprising a movable roll that imparts variable geometry on the one or plurality endless baling belts. The variable geometry allows additional force and tension to the bale while the bale is transferring from a first position to a second position. The extra tension created by the bale gate movement of the one or plurality of baling belts allows the bale to maintain its shape and increase its density during the transfer process.

In some embodiments, the harvester comprises a first serpentine system comprising a second bale gate that is capable of movement between a closed position and one or more open positions. In some embodiments, the harvester comprises the second bale chamber comprises a second serpentine system comprising a third bale gate that is capable of movement between a closed position and one or more open positions. In some embodiments the third bale gate further comprises a plate that defines an outward (backward) face of the third bale gate. In some embodiments, the plate provides a physical barrier between the inside of the harvester and the outside environment. The harvester also comprises a conveyor system that operably links the first and the second bale chamber. The conveyor system comprises a first bale gate that assists the transfer of a bale from the first bale chamber to the second bale chamber. In some embodiments, the conveyor system also allows crop material to be transferred through the first bale chamber to the second bale chamber. In some embodiments, the harvester comprises a wrapping system that assist the transfer of a bale from the first bale chamber to the second bale chamber and also wraps a completed bale with wrapping material before the bale is ejected from the second bale chamber. In some embodiments, the wrapping system is operably connected to both the first and the second serpentine systems. In some embodiments, the wrapping system is operably linked to the first bale gate of the conveyor system by an adjustment system.

In some embodiments, when a bale is growing in at least one bale chamber and no crop material is being transferred to a second position from the at least one bale chamber, the one or more bale gates in the conveyor are in a stationary position and one or more movable rolls in the conveyor are in a stationary position exacting a steady or substantially steady tension of the one or plurality of endless belts in the conveyor. Upon initiation of movement of the one or plurality of bale gates from a stationary position to one or more open positions, the movable rolls of the conveyor may move to maintain a steady or substantially steady tension of the one or plurality of endless belts in the conveyor such that the shape of the endless belts around the conveyor define a geometry of the conveyor that is different than the geometry in its original stationary position. In some embodiments, the first and second serpentine systems and the conveyor possess variable geometries at one or a plurality of different positions during operation and/or transfer of the bale from one position to a second position within or out of the harvester.

The present disclosure relates to a continuous round baler comprising: a first bale chamber and a second bale chamber operably coupled by a conveyor system; wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls; wherein the conveyor system is positioned between the first and second bale chambers at a downward angle from the front of the baler to the rear of the baler; wherein the conveyor is positioned to allow gravity-assisted transfer of the bale from the first bale chamber to the second bale chamber; and wherein the wrapping system is positioned between the first and second bale chambers to both assist the transfer of a bale from the first to the second bale chamber and wrap a bale in the second bale chamber in wrapping material.

Referring to FIG. 1, a generally well-known round baler 10 is shown to include a main frame terminating forwardly in a tongue 11 and rearward slightly beyond a transverse axle 12a to which a pair of wheels 12b (only one shown) is mounted, thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed into bale-forming chamber 20 where it is formed into a cylindrically shaped ball (not shown) by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground. For clarity and purposes of the instant disclosure, the tailgate 50 and hydraulic mechanism that controls the upward swing of the tailgate are replaced by the crop collection system (also referred to as a bale collection and ejection system) comprising the serpentine system depicted in FIGS. 3-5, wherein at least one third bale gate comprises or are in operable contact with two hydraulic tensioning actuators on opposite sides of the sidewalls. In some embodiments of the present disclosure, a pair of hydraulic tensioning actuators are positioned between the outside of the sidewalls and under the main frame of the baler. In some embodiments, the tensioning actuators are electrically powered and are positioned on opposite sides of the sidewalls. In some embodiments of the present disclosure, tensioning actuators are positioned on the outside of the sidewalls and attached to the main frame of the baler. In some embodiments, the tensioning actuators are electrically powered and on opposite sides of the sidewalls.

FIGS. 2A and 2B depict exemplary side external perspectives of embodiments of the claimed disclosure, each embodiment depicting a continuous round baler with a mainframe being towed by a tractor 160. Cut crop material 130 is picked up by the transverse pickup 140 positioned forward from two axles (not pictured) that support the wheels 150a, 150b of the baler. FIG. 2A depicts a cylindrically shaped bale 120, which is formed within in the two bale chambers (not shown), and optionally wrapped in net wrapping or twine deposited from a device in operable contact with the second bale chamber. The cylindrically shaped bale 120 is ejected without a bale ramp through a bale chamber outlet 110 positioned at the rear of the baler 100. The bale 120 rests directly on the ground after ejection. FIG. 2B depicts a similarly shaped bale 120 being ejected from the bale chamber outlet positioned at the rear of the continuous round baler 180 onto a bale ramp 170. In some embodiments, the bale ramp 170 provides balance to the continuous round baler so that ejection of the bale can be accomplished on a hill or field with a slight incline. In some embodiments, the continuous round baler does not comprise a tailgate that operates on a single hinge. In some embodiments, the continuous round baler does not comprise a bale ramp. In some embodiments, at least a first set of two hydraulic or electronic tensioning actuators positioned on the outside of the opposite sidewalls (and under the mainframe) raise and lower a first third bale gate positioned over the outlet of the first bale chamber. In some embodiments, a second set of two hydraulic or electronic tensioning actuators positioned on the outside of the opposite sidewalls (and under the mainframe) raise and lower a second third bale gate positioned over the inlet of the second bale chamber. In some embodiments, a third set of two hydraulic or electronic tensioning actuators positioned on the outside of the opposite sidewalls and under the mainframe raise and lower a third bale gate positioned over the outlet of the second bale chamber. In some embodiments, at least a first set of two hydraulic or electronic tensioning actuators positioned on the side of the opposite sidewalls and under the mainframe raise and lower a first, second, and/or third bale gate positioned over the inlet or outlet of the first or second bale chamber.

FIGS. 3-13 depicts the function of the internal mechanisms of an exemplary cross-sectional side-view of a continuous round baler during various stages of operation. It is understood that the components of the continuous round baler may function is a serial, stepwise, or simultaneous fashion, but that all steps described in FIGS. 3, 4, 5, 6, 7, 8, 9, 10, 11, 12, and 13 illustrate one embodiment of a single cycle of continuous baling for the purposes of the disclosure.

Figure 3:
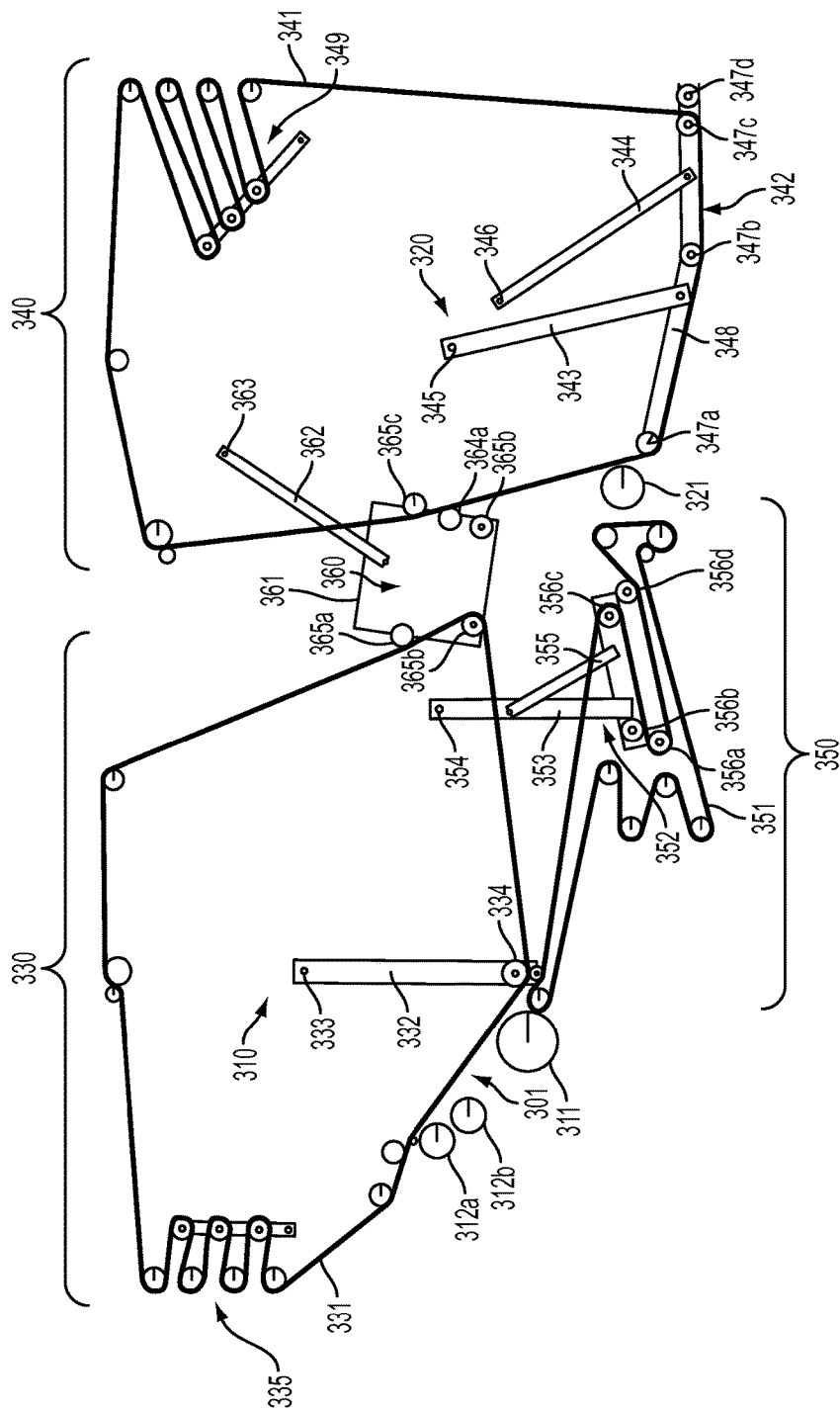
FIGS. 3-13 depict the internal mechanisms of a continuous harvester, with two bale chambers, three bale transfer mechanisms, and a wrapping mechanism in various stages of operation.

FIG. 3 depicts the internal mechanisms of a continuous round baler, comprising a first bale chamber 310, a second bale chamber 320, a first serpentine system 330, a second serpentine system 340, a conveyor system 350, and a wrapping system 360. The first bale chamber 310 is defined in part by a front floor roller 311, two front chamber rollers 312a and 312b, and the first serpentine system 330 containing one or a plurality of endless belts 331, a second bale gate 332 attached to a pivot point 333 and a movable roller 334, and a first slack adjustment system 335. The second bale chamber 320 is defined in part by a rear floor roller 321, and the second serpentine system 340 containing one or a plurality of endless belts 341, a third bale gate 342 comprising two arms 343, 344, two pivot points 345, 346, a series of movable rollers 347a, 347b, 347c, 347d, and a fixed member 348, and a second slack adjustment system 349. The conveyor system 350 is defined in part by one or a plurality of endless belts 351 and a first bale gate 352 comprising an arm element 353 attached to a pivot point 354, a fixed member 355 and a series of movable rollers 356a, 356b, 356c, 356d. The wrapping system 360 is defined in part by a subframe 361, a supporting arm 362 attached to a pivot point 363, two bale compression rolls 364a, 364b, and three belt rolls 365a, 365b, 365c. In the depicted embodiment, the supporting arm is engaged in an wrapping position and one or a plurality of non-wrapping positions. In some embodiments, the non-wrapping positions are one or a plurality of raised positions. In some embodiments, the at least one supporting arm operably connected to the subframe by at least one flexible joint or point such that the subframe can move radially at the at least one flexible joint or point.

In the depicted embodiment of FIG. 3, the continuous round baler is at the beginning of a first operational cycle. Crop in the field is usually arranged in a windrow as it is engaged by the baler being pulled along the windrow by a tractor (not shown). Crop is conveyed into the first bale chamber 310 through an inlet point 301 fed by a transverse pickup or a rotary cutter (not shown), where it is rolled into a cylindrical bale. In the depicted embodiment, the second bale gate 332 is in a closed position, the first bale gate 352 is in a lowered position, the wrapping system 360 is in a wrapping position, and the third bale gate 342 is in a closed position.

Figure 4:
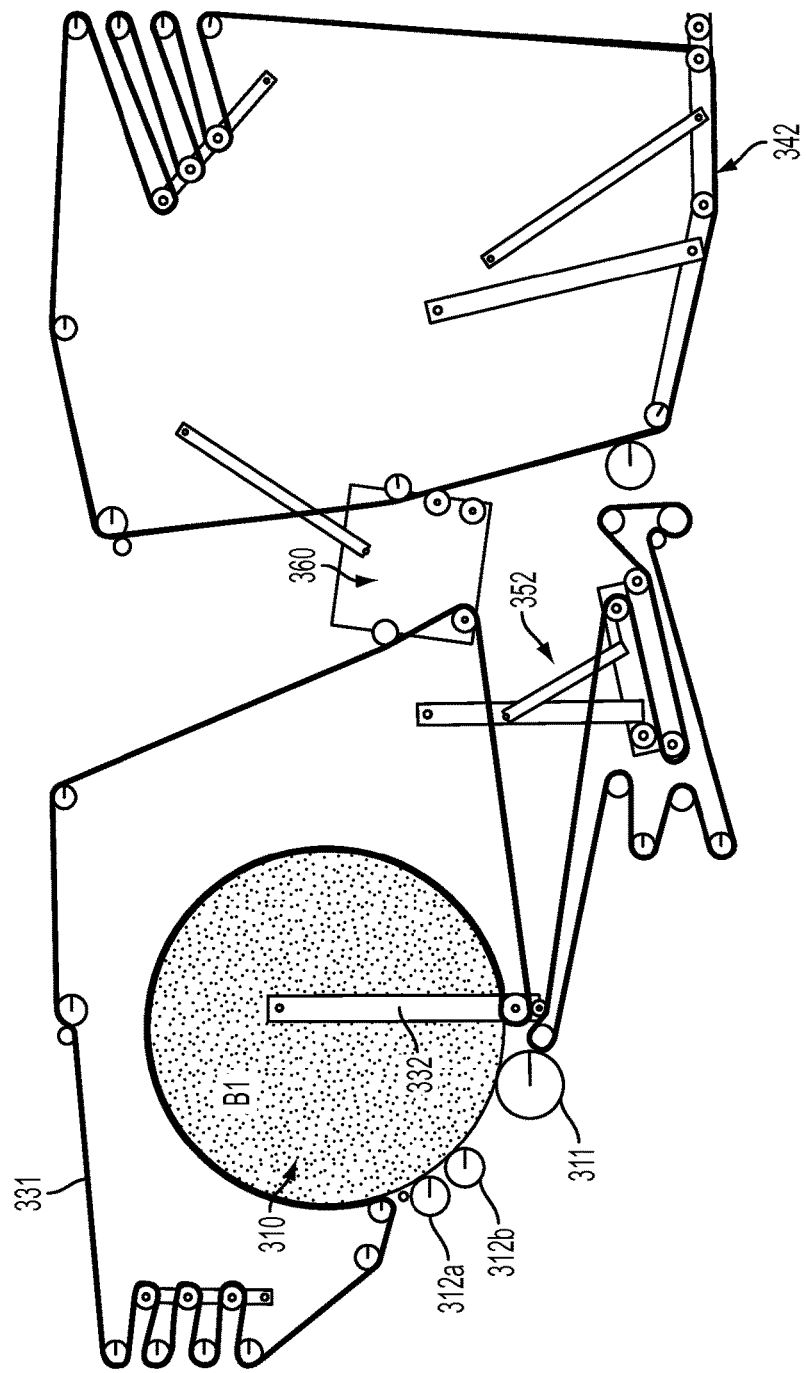

FIG. 4 depicts the series of events that occur sequentially or simultaneously after the steps in FIG. 3 have occurred. In FIG. 4, enough crop has entered into the first bale chamber 310 to form a bale B1 which is supported in part by the front floor roller 311, the two front chamber rollers 312a and 312b, and the one or a plurality of endless belts of the first serpentine system 331. The positions of the second bale gate 332, the first bale gate 352, the wrapping system 360 and the third bale gate 342 are all similar to their positions in FIG. 3.

Figure 5:
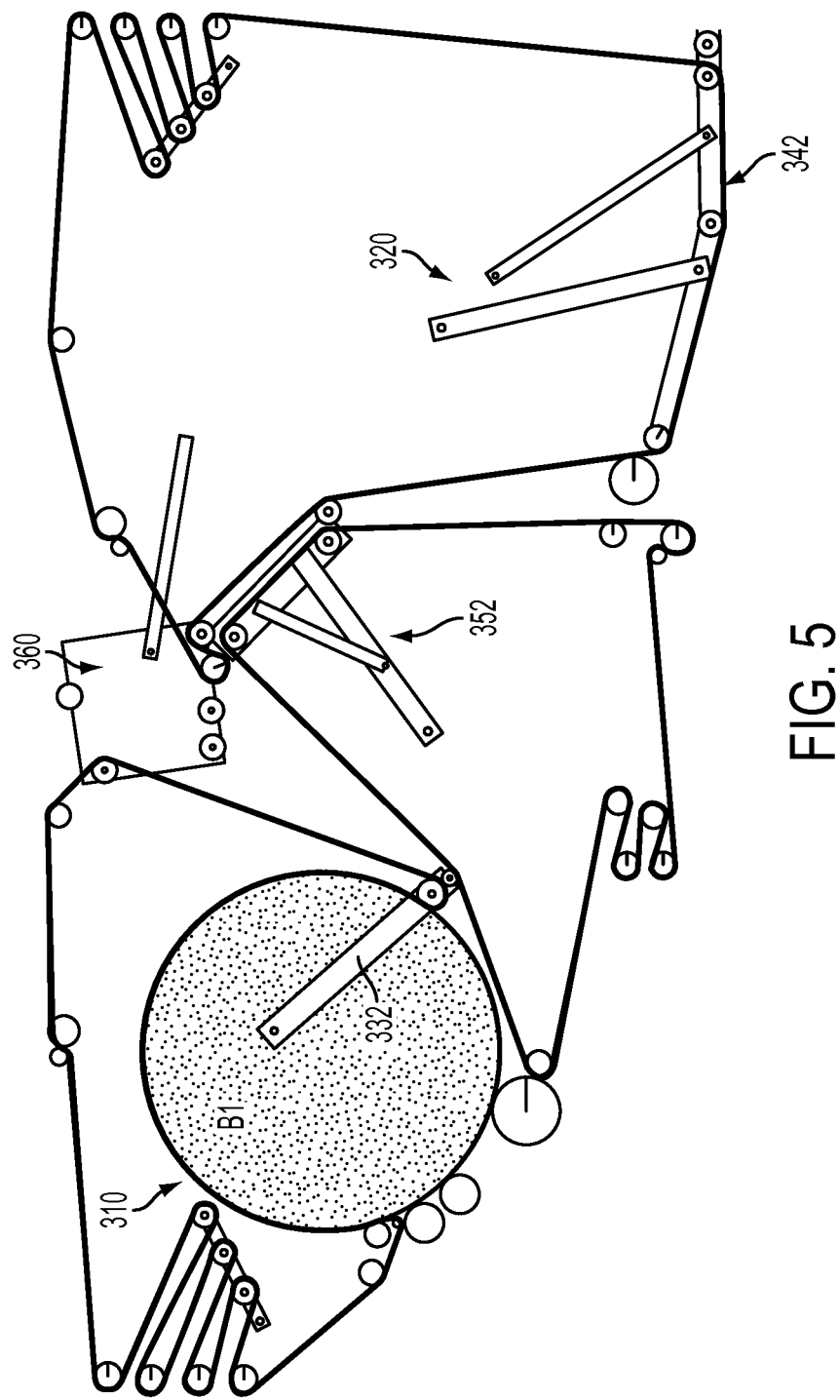

FIG. 5 depicts the series of events that occur sequentially or simultaneously after the steps in FIG. 4 have occurred. In FIG. 5, the bale B1 is beginning its transfer from the first bale chamber 310 to the second bale chamber 320. The second bale gate 332 is in an open position, and its continued upward and rearward movement will allow the bale B1 to be release from the first bale chamber 310. The wrapping system 360 is in a fully raised position, in part to allow room for the first bale gate 352 in a fully raised position. The third bale gate 342 remains in a closed position.

Figure 6:
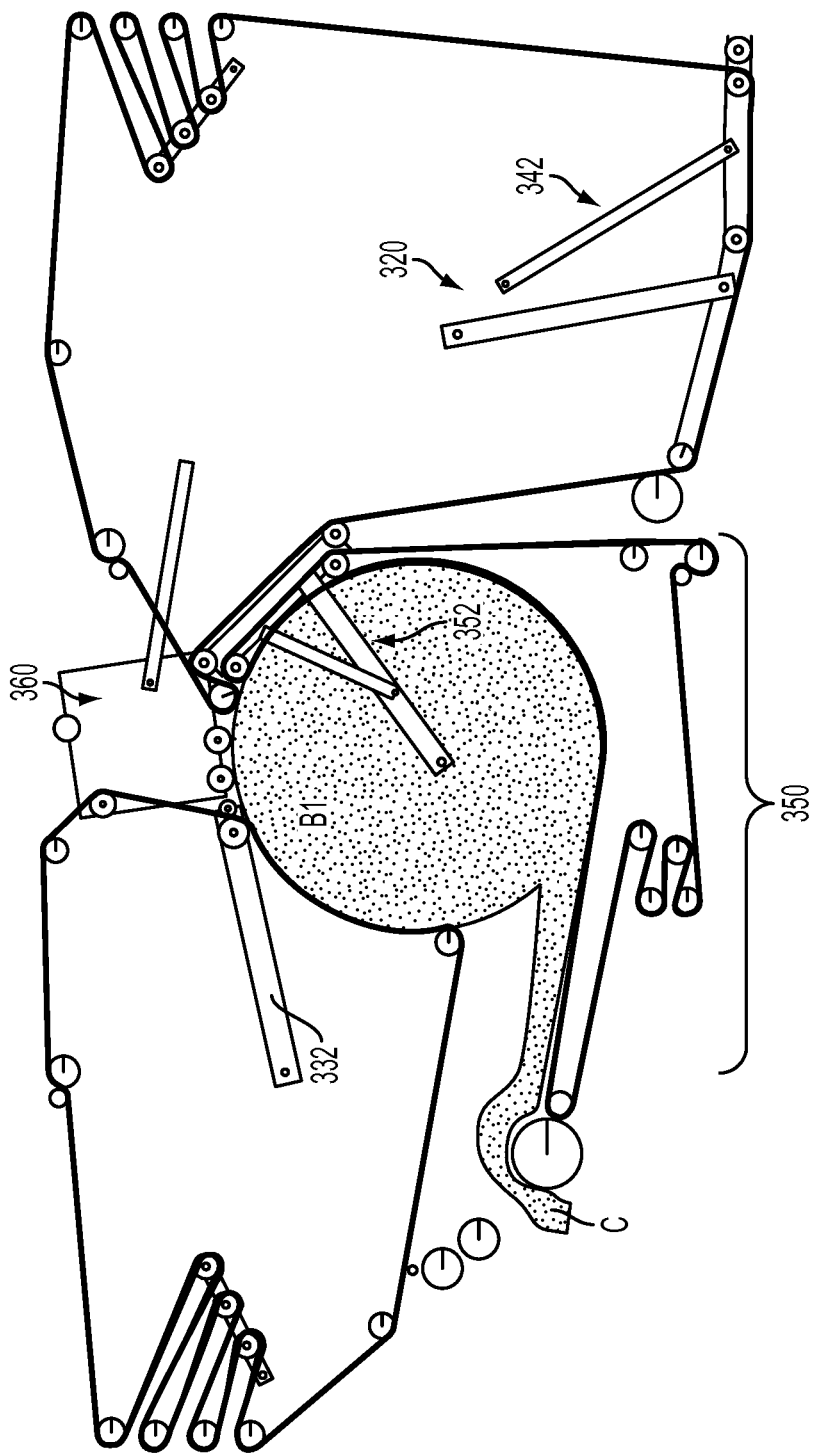

FIG. 6 depicts the series of events that occur sequentially or simultaneously after the steps in FIG. 5 have occurred. In FIG. 6, the bale B1 is half way between the first bale chamber 310 and the second bale chamber 320, as is mostly supported by the conveyor system 350. The second bale gate 332 is in a fully open position. The wrapping system 360 is still in a fully raised position, and is now in operable contact with the bale B1. The first bale gate 352 is still in a fully raised position, but its eventual return to a lowered position will allow the bale B1 to finish its transfer into the second bale chamber 320. The third bale gate 342 remains in a closed position. During this transfer process, crop material C continues to be fed to the bale B1.

Figure 7:
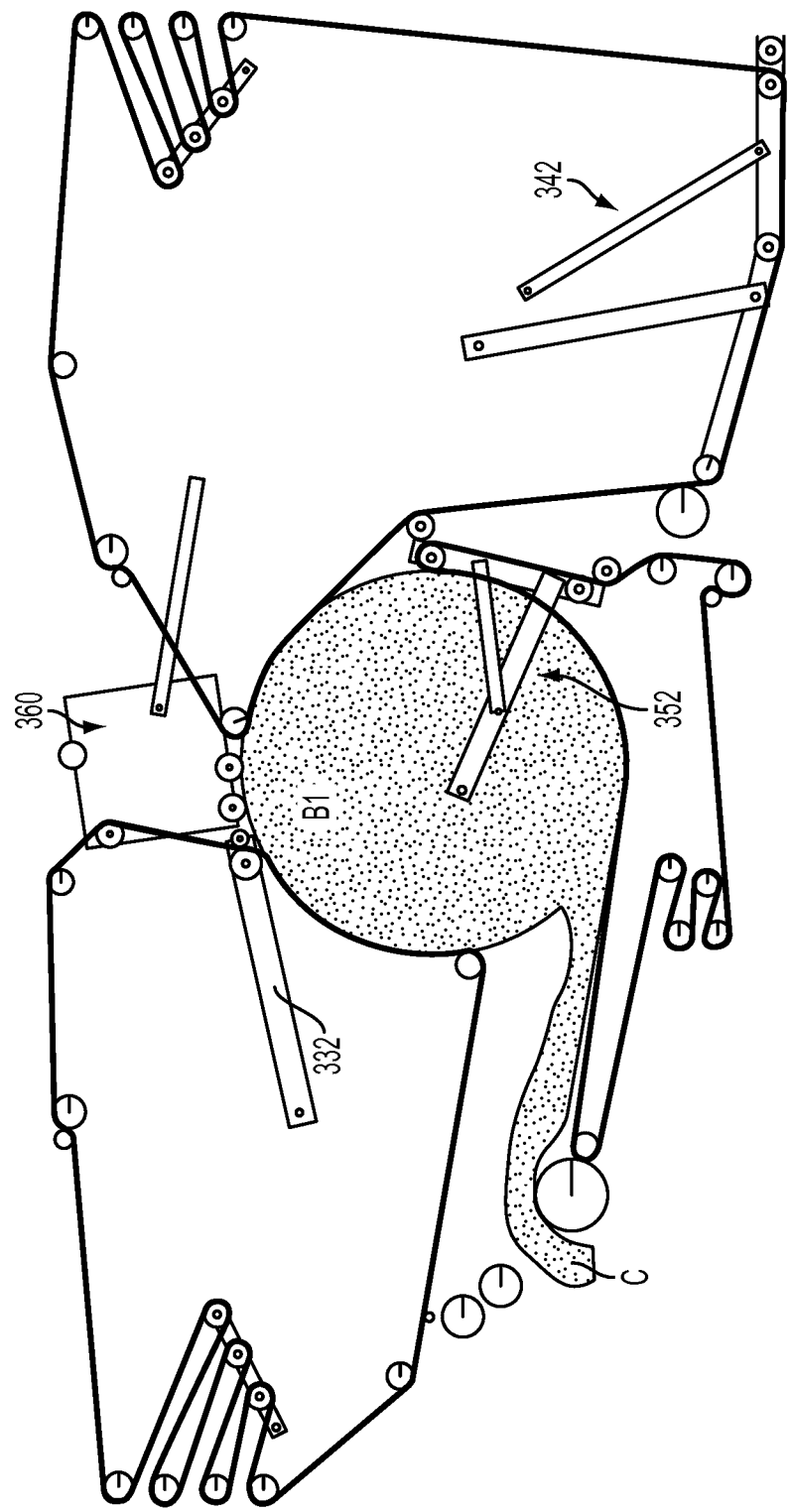

FIG. 7 depicts the series of events that occur sequentially or simultaneously after the steps in FIG. 6 have occurred. FIG. 7 is similar to FIG. 6 in most respects, expect that the first bale gate 352 is in a partially raised position, and the bale B1 begins to move further into the second bale chamber 320.

Figure 8:
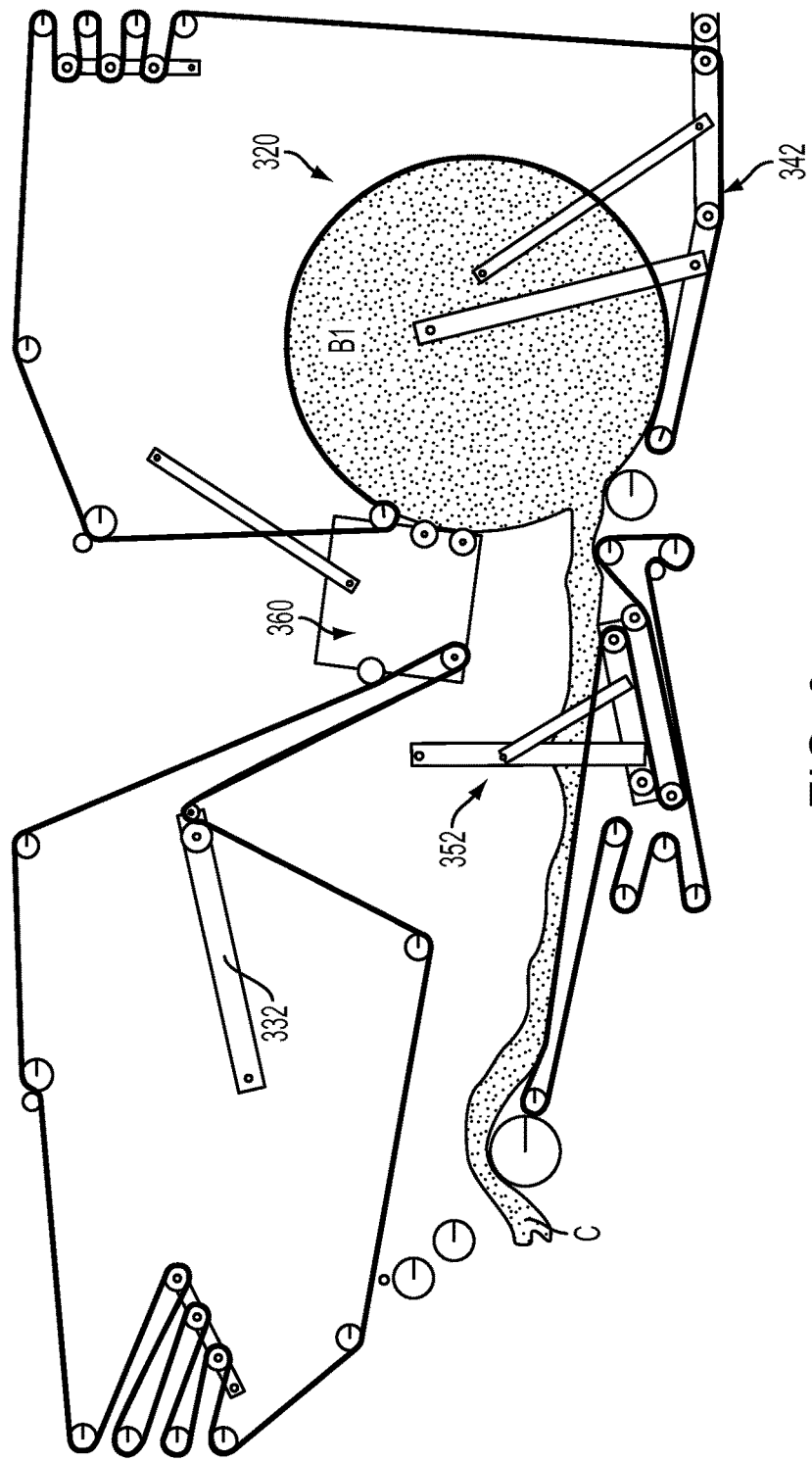

FIG. 8 depicts the series of events that occur sequentially or simultaneously after the steps in FIG. 7 have occurred. In FIG. 8, the bale B1 has moved fully into the second bale chamber 320. The second bale gate 332 is still in an open position to allow the crop material C to be continually fed to the bale B1. The first bale gate 352 has returned to a lowered position, and the wrapping system 360 has returned to a wrapping position. The third bale gate 342 is still in a closed position.

Figure 9:
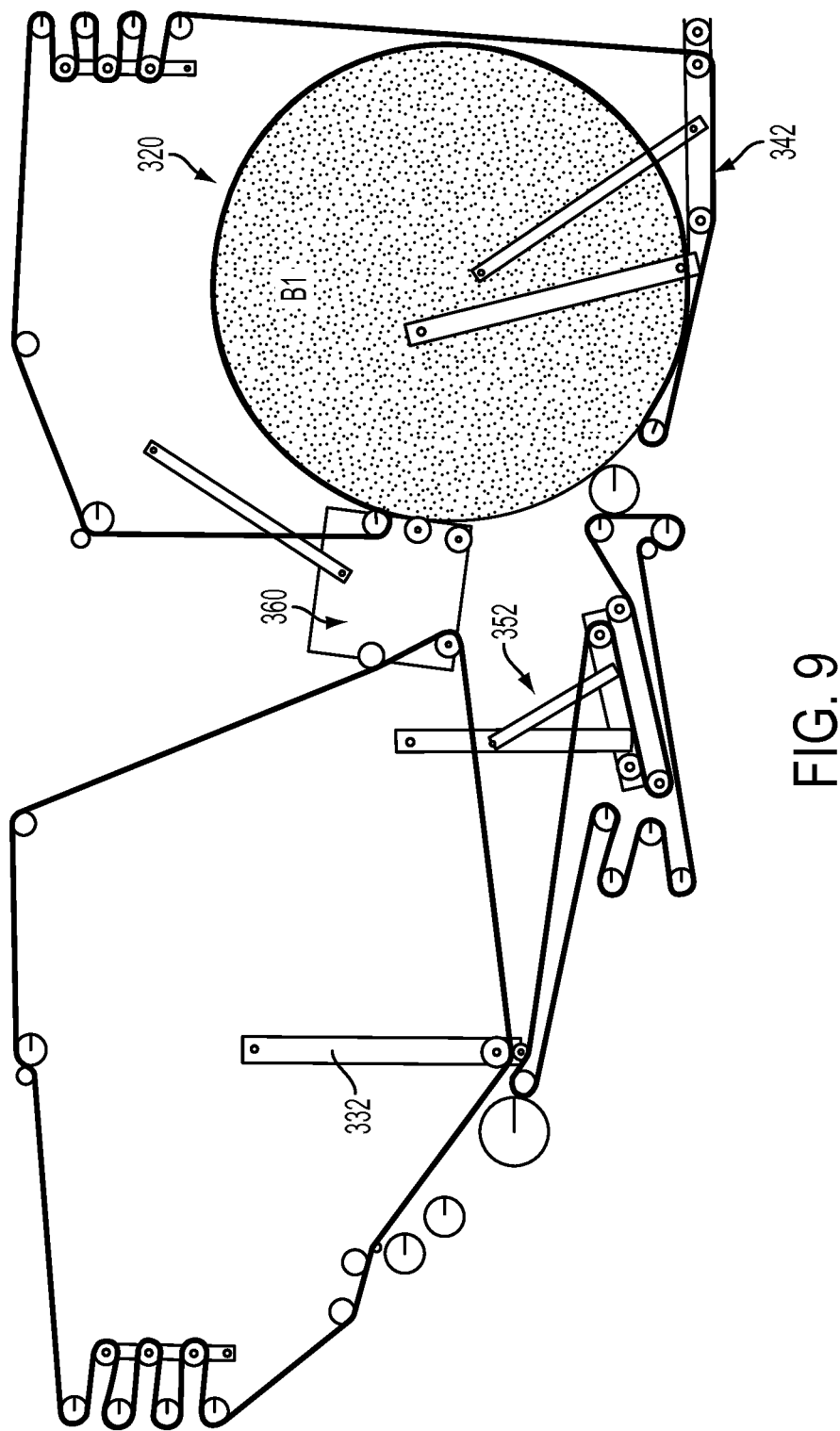

FIG. 9 depicts the series of events that occur sequentially or simultaneously after the steps in FIG. 8 have occurred. In FIG. 9, the bale B1 has grown in size to a predetermined diameter. The second bale gate 332 has returned to a closed position, and crop material is no longer fed to the bale B1. The wrapping system 360 is still in a wrapping position, and may optionally be wrapping the bale B1. The third bale gate 342 is still in a closed position.

Figure 10:
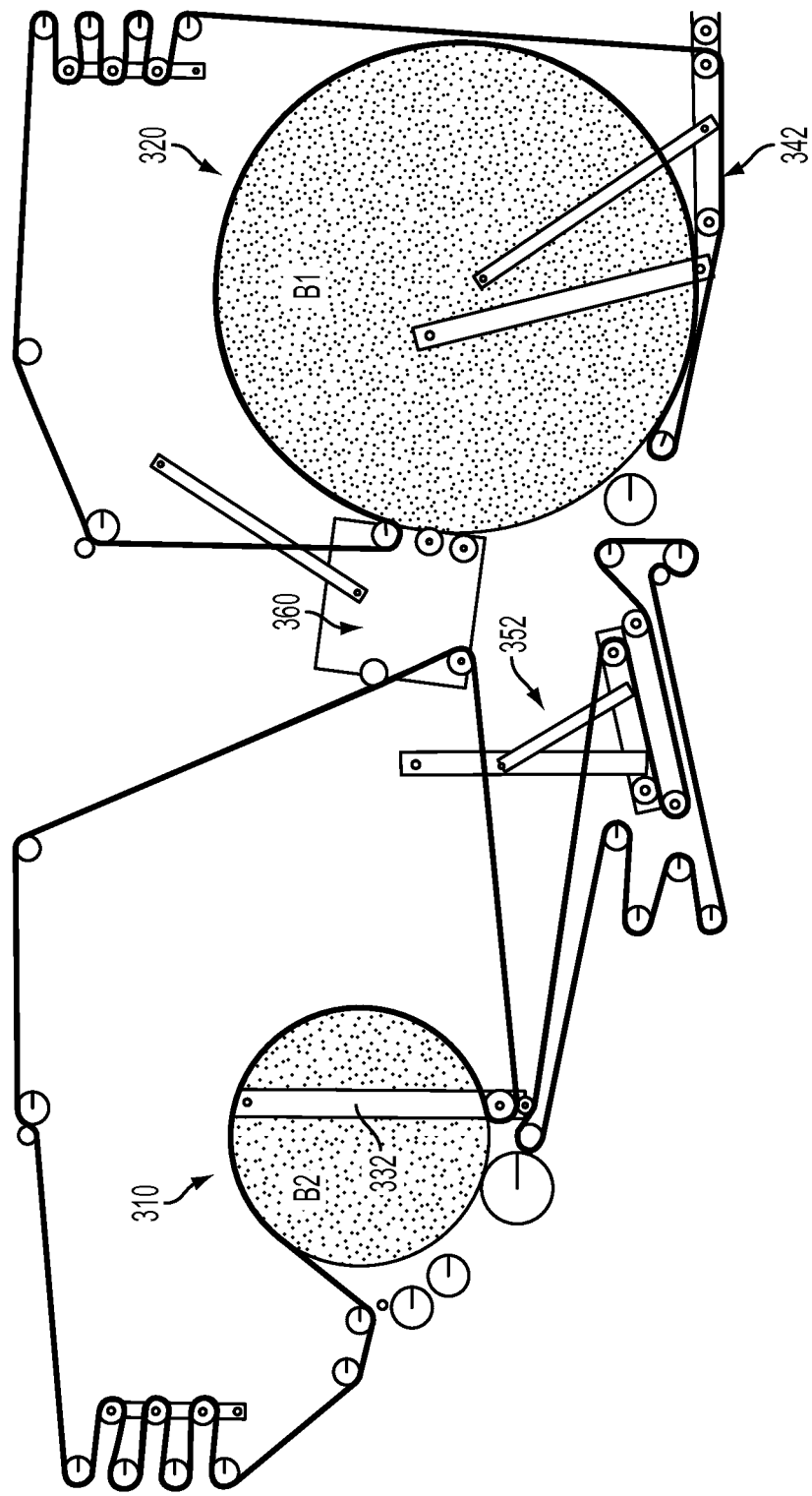

FIG. 10 depicts the series of events that occur sequentially or simultaneously after the steps in FIG. 9 have occurred. In FIG. 10, crop material is conveyed into the first bale chamber 310 where it is rolled into a new cylindrical bale B2. The second bale gate 332 is a closed position, the first bale gate 352 is in a lowered position, the wrapping system 360 is in a wrapping position optionally wrapping the bale B1, and the third bale gate 342 is in a closed position.

Figure 11:
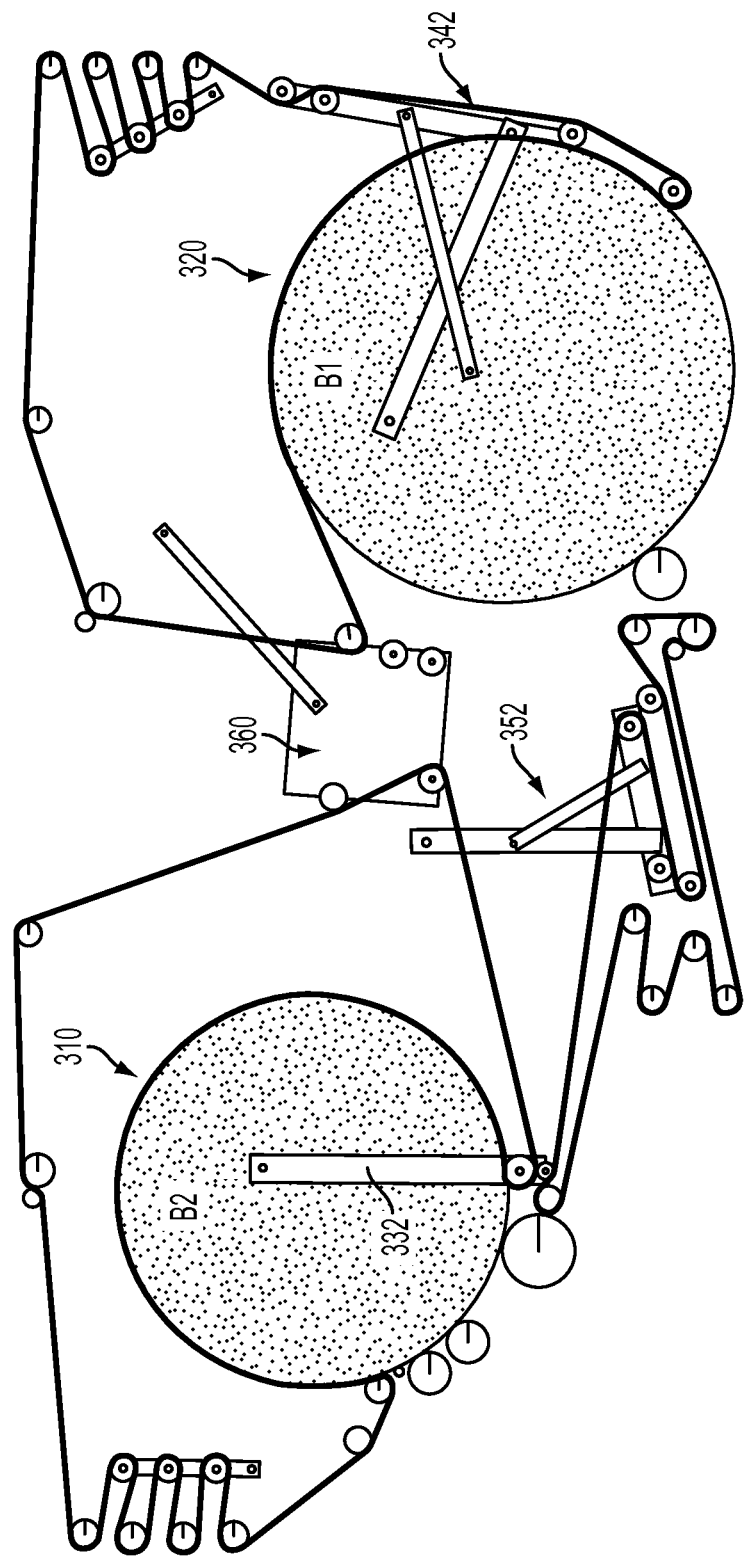

FIG. 11 depicts the series of events that occur sequentially or simultaneously after the steps in FIG. 10 have occurred. In FIG. 11, bale B1 is being ejected from the system. The third bale gate 342 is in a partially open position, which allows the bale B1 to begin to move out of the second bale chamber 320. Concurrently, the newer bale B2 continues to grow in size in the first bale chamber 310. The second bale gate 332 remains in a closed position, the first bale gate 352 remains in the lowered position, and the wrapping system 360 remains in a wrapping position.

Figure 12:
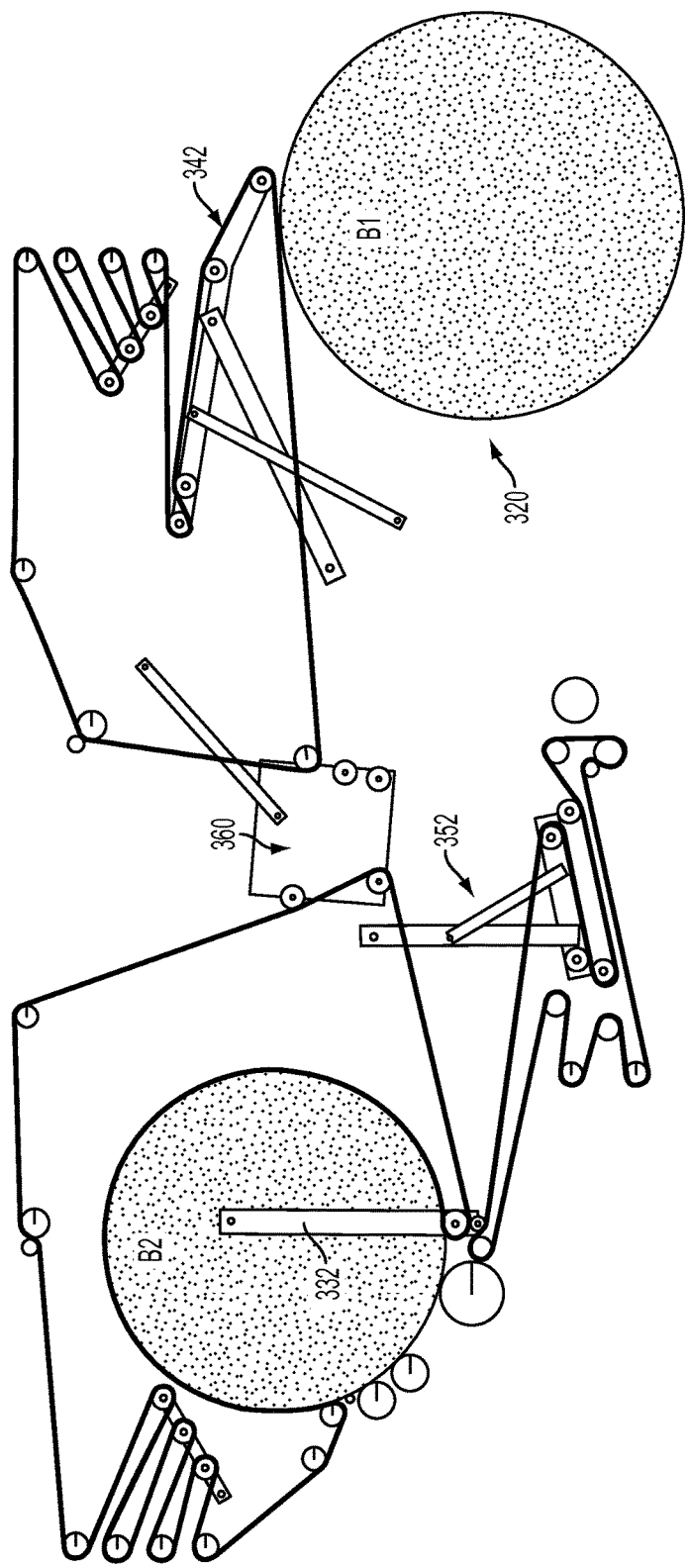

FIG. 12 depicts the series of events that occur sequentially or simultaneously after the steps in FIG. 11 have occurred. In FIG. 12, the bale B1 is completely ejected from the second bale chamber 320 and onto the ground. The third bale gate 342 is in a fully open position to facilitate the complete ejection of the bale B1. The second bale gate 332 remains in a closed position, the first bale gate 352 remains in a lowered position, and the wrapping system 360 remains in a wrapping position.

Figure 13:
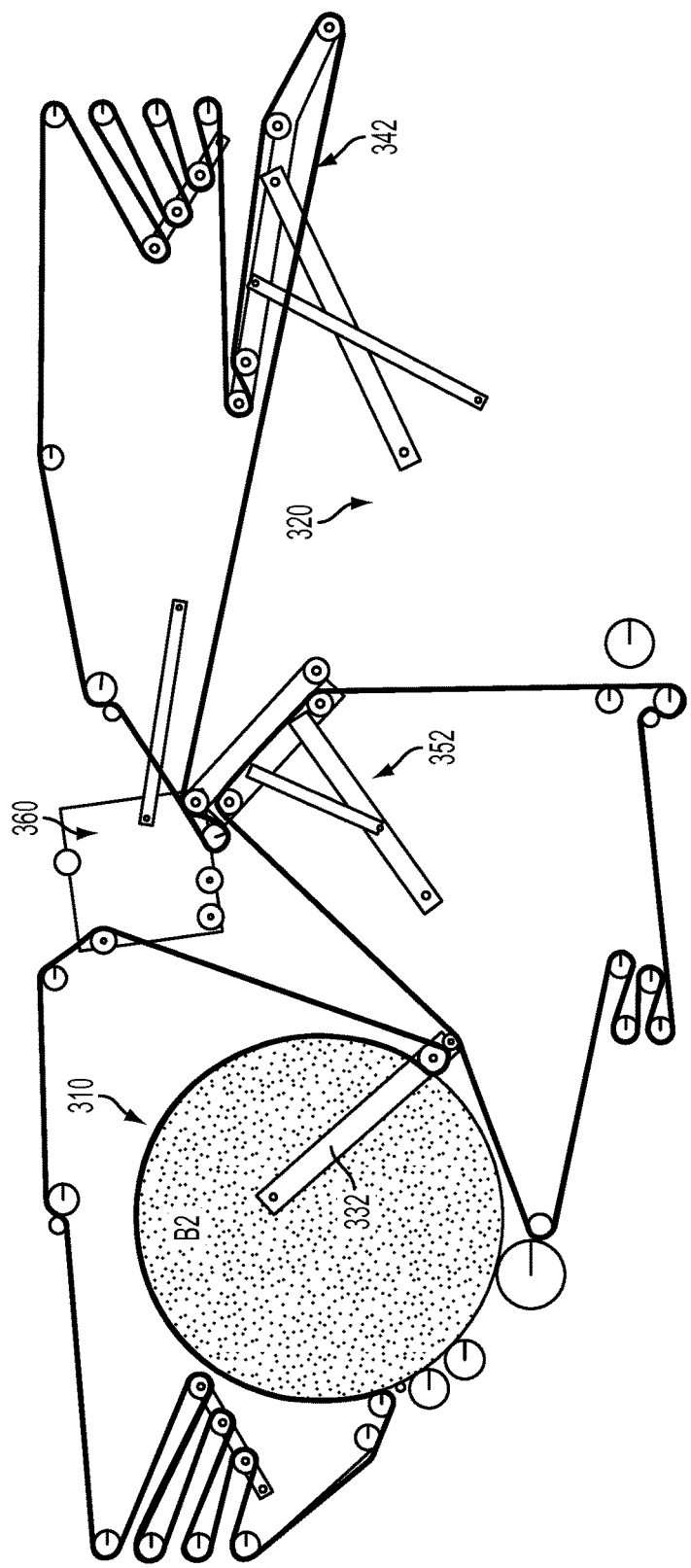

FIG. 13 depicts the series of events that occur sequentially or simultaneously after the steps in FIG. 12 have occurred. In FIG. 13, the newer bale B2 will soon begin its transfer from the first bale chamber 310 to the second bale chamber 320. The second bale gate 332 is in a partially open position, and its continued upward and rearward movement will allow the bale B2 to be release from the first bale chamber 310. The wrapping system 360 is in a fully raised position, in part to allow room for the first bale gate 352 in a fully raised position. The third bale gate 342 is still in a fully open position, but will soon return to a closed position to accept the bale B2 into the second bale chamber 320.

Figure 14:
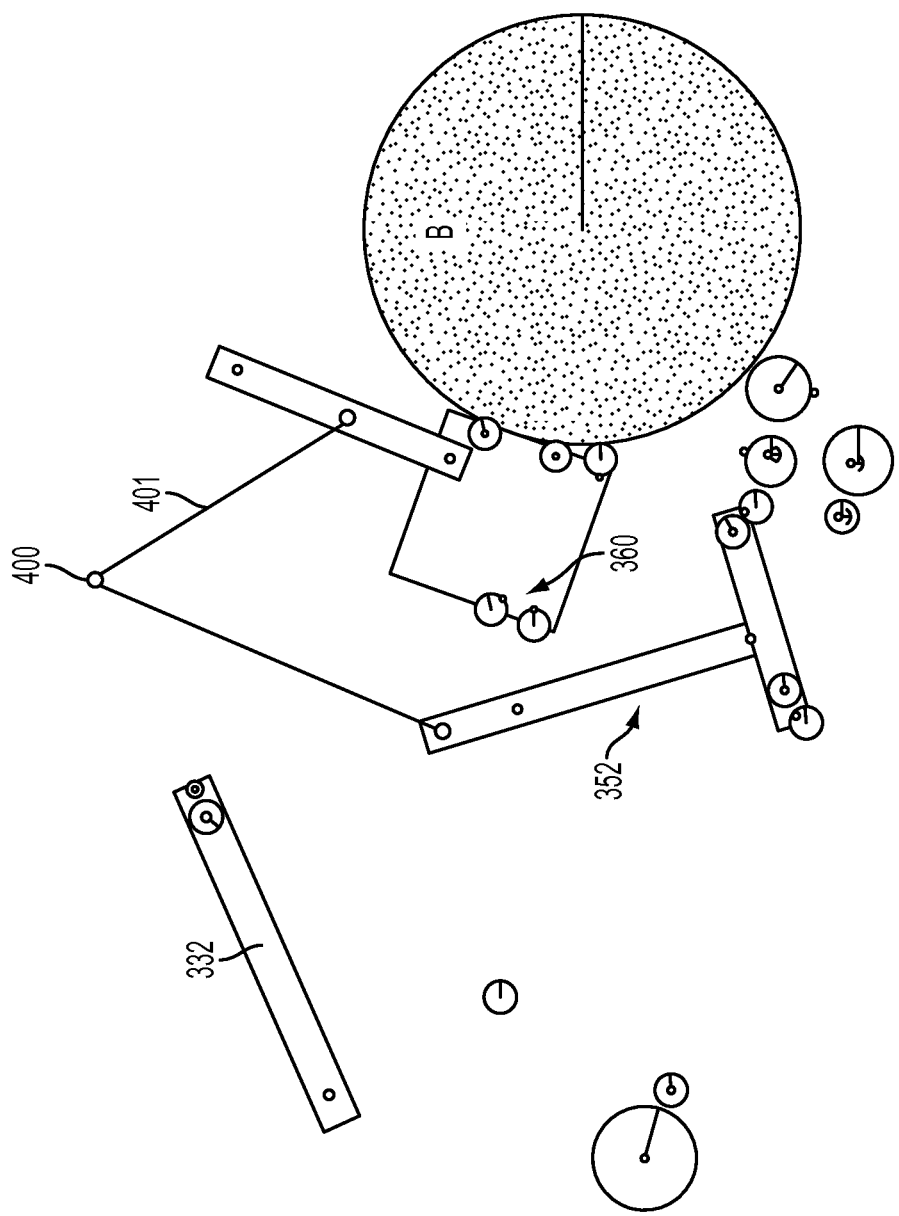
FIG. 14 depicts another embodiment of the internal mechanism of a continuous harvester where the wrapping mechanism is connected to an adjustment system.

FIG. 14 depicts an optional adjustment system to determine the optimum height of the wrapping system 360, so that it may follow the contour of a bale B during transfer. The pulley system consists of a pulley 400 and a cable 401 that is attached to the wrapping system 360 at one end, and the first bale gate 352 at the other end. In the depicted embodiment, the second bale gate 332 is shown for reference. In some embodiments, the adjustment system uses a mechanical linkage instead of the pulley 400 and cable 401.

Figure 15:
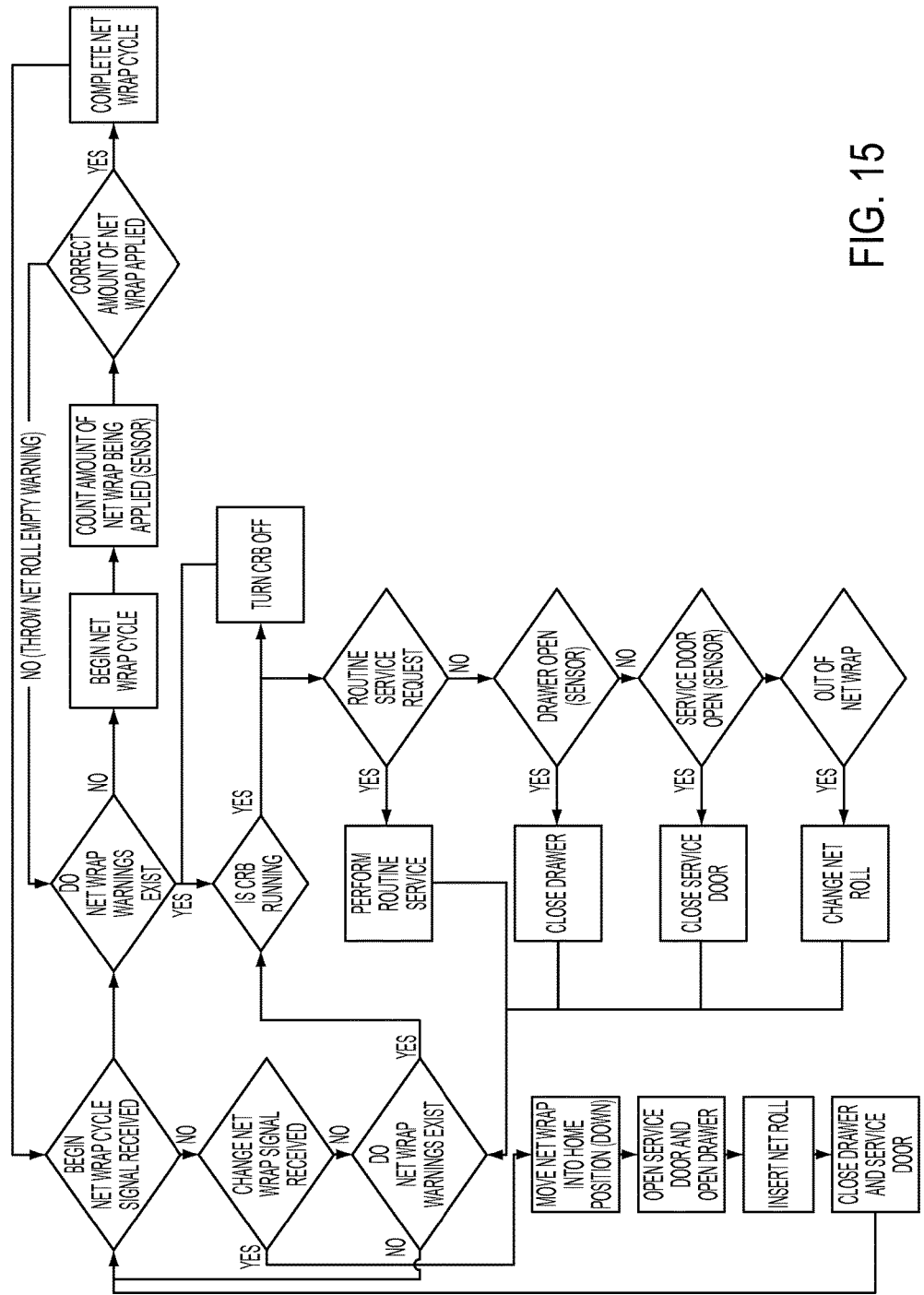
FIG. 15 depicts a schematic diagram of a control system for indicating information to an operator via a controller.

FIG. 15 depicts a schematic diagram of a control system for indicating different types of information to an operator via a controller. Such information is relayed to the control system by sensors, and may include information on the operational condition of a wrapping mechanism. In the depicted embodiment, the control system can indicate warnings when the correct amount of wrapping material is not applied, the wrapping material has run out, one or more systems or mechanisms are in need of routine service, a moveable subframe is not in a closed position, or a service panel has been left open. In some embodiments, the control system can also make sure the harvester is not currently running before the changing of wrapping material or other service. In some embodiments, the control system displays warning and other information via a controller.

In some embodiments, the systems and harvesters disclosed herein comprise at least one controller that operates and is in electronic communication with at least one bale gate. In some embodiments, the systems and harvesters disclosed herein comprise at least one sensors within or proximate to at least one bale chamber.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications is incorporated by reference herein, in its entirety.

What is claimed is:

1. A harvester comprising:
  a first bale chamber and a second bale chamber, operably coupled by a conveyor system comprising:
    a pair of sidewalls;
    a plurality of rolls positioned between the sidewalls around which at least one baling belt is positioned for operably rotating; and
    a first bale gate comprising:
      at least one first bale gate arm operably connected to at least one of the plurality of rolls, the at least one first bale gate arm mounted on at least one sidewall of the pair of sidewalls about at least one pivot point, wherein the at least one first bale gate arm is configured to exact tension on the at least one baling belt; wherein the at least first bale gate arm is capable of radial movement from a lowered position to at least one raised position; wherein the first bale gate is configured for operation proximate to or partially within at least one of the first and second bale chambers and wherein the radial movement facilitates bales transfer across at least a portion of the baling belts;
    wherein the plurality of rolls comprise at least one set of movable rolls and at least one drive roll; wherein the set of movable rolls are movable in a frontward and rearward direction; wherein the at least one drive roll is configured to drive direction and movement of the at least one baling belt;
    wherein the first bale chamber is positioned forward of the second bale chamber with the conveyor system spanning therebetween;
    wherein each of the first and second bale chambers comprise:
      an entry point into which crop material flows,
      an outlet, and
      at least one transverse floor roller; and
    wherein at least one roll of the conveyor system defines a bottom portion of the first bale chamber.

2. The harvester of claim 1 further comprising:
  a first serpentine system for the first bale chamber, the first serpentine system comprising:
    a second bale gate positioned in the first bale chamber, the second bale gate comprising at least one second bale gate arm and at least one second bale gate roll attached thereto; wherein the at least one second bale gate arm is mounted about a second bale gate pivot point; wherein the second bale gate is configured to exact tension on the at least one baling belt; wherein the second bale gate is configured for radial movement from a closed position to at least one open position; and wherein the radial movement facilitates bale transfer of from the first bale chamber into the second bale chamber;

the at least one baling belt in operable contact with the at least one second bale gate roll, around which the at least one baling belt is capable of rotation; and a second serpentine system for the second bale chamber, the second serpentine system comprising:

a third bale gate positioned at the outlet of the second bale chamber, the third bale gate comprising at least one third bale gate arm, at least one fixed member operably connected to the at least one third bale gate arm, and at least two movable third bale gate rollers; wherein the at least one third bale gate arm is mounted about at least two third bale gate pivot points; wherein the third bale gate is capable of radial movement from a closed position to at least one open position; and wherein the radial movement facilitates bale ejection from the second bale chamber;

wherein the at least one baling belt is in operable contact with the at least two movable third bale gate rollers.

3. The harvester of claim 2 further comprising:

a first slack adjustment system for the first bale chamber, the first slack adjustment system comprising at least one slack adjustment arm and at least one movable slack adjustment roll attached thereto; wherein the at least one slack adjustment arm is connected to at least one sidewall of the pair of sidewalls; wherein the at least one movable slack adjustment roll is capable of sliding from a first position to a second position to take up or release slack in the at least one baling belt in the first serpentine system; and a second slack adjustment system for the second bale chamber, the second slack adjustment system comprising at least one second slack adjustment arm and at least one movable second slack adjustment arm roll attached thereto; wherein the at least one movable second slack arm roll is capable of sliding from a first position to a second position to take up or release slack in the at least one baling belt in the second serpentine system.

4. The harvester of claim 2, wherein the second bale gate is operably synchronized with the transfer of a bale from the first bale chamber to the second bale chamber such that:

in the closed position the at least one second bale gate roll is in a downward first position, preventing the exit of the bale from the first bale chamber;

in a first open position of the at least one open position of the second bale gate roll, the at least one second bale gate roll is positioned upward and rearward from the downward first position, allowing the bale in the first bale chamber to transfer into the second bale chamber; and in a second open position, the at least one roll of the second bale gate pivots downward and frontward, allowing crop material to transfer from the first bale chamber into the second bale chamber, but preventing the exit of the bale from the first bale chamber.

5. The harvester of claim 2, wherein the third bale gate is operably synchronized with bale transfer from the first bale chamber to the second bale chamber such that the at least two movable third bale gate rolls slide upward prior to bale ejection from the second bale chamber.

6. The harvester of claim 2 further comprising at least a first, second, third and fourth operable conditions, wherein:

the first operable condition comprises the second bale gate in a closed position, and the third bale gate in a closed position, wherein the second bale gate in the closed position facilitates formation of harvested crop material into a bale, wherein the third bale gate in the fully closed position allows a second bale to exist in the second bale chamber;

the second operable condition comprises the second bale gate in an open position, and the first bale gate in a raised position, wherein the second bale gate in an open position, and the first bale gate in the raised position allow for bale transfer from the first bale chamber to the second bale chamber;

the third operable condition comprises the second bale gate in an open position, the first bale gate in a lowered position, and the third bale gate in a closed position, wherein the second bale gate in the open position, the first bale gate in the lowered position, and the third bale gate in the closed position allow for crop to be transferred through the first bale chamber, and into the second bale chamber;

the fourth operable condition comprises the third bale gate in an open position for the evacuation of the bale from the harvester.

7. The harvester of claim 2 further comprising:

a wrapping system comprising:

a plurality of wrapping system rolls positioned operably connected to a subframe;

at least one wrapping system arm operably connected to the subframe, the wrapping system arm radially mounted on at least one sidewall about at least one wrapping system arm pivot point; wherein a length of the wrapping system arm and the subframe are capable of radial movement about the at least one wrapping system arm pivot point from a wrapping position to at least one raised position;

wherein the plurality of wrapping system rolls comprises at least one belt roll, around which the at least one baling belt is operably rotating; wherein the at least one belt roll is capable of exacting tension in the baling belts;

wherein the radial movement facilitates bale transfer from the first bale chamber.

8. A harvester comprising:

a first bale chamber and a second bale chamber, operably coupled by a wrapping system comprising:

a plurality of rolls operably connected to a subframe;

at least one supporting arm operably connected to the subframe, the supporting arm radially mounted on at least one sidewall about at least one supporting arm pivot point; wherein a length of the supporting arm and the subframe are capable of radial movement about the at least one supporting arm pivot point from a wrapping position to at least one raised position;

wherein the plurality of rolls comprises at least one belt roll, around which at least one baling belt is operably rotating; wherein the at least one belt roll is capable of exacting tension in the baling belts;

wherein the radial movement of the at least one supporting arm and subframe facilitates bale transfer from the first bale chamber;

wherein the first bale chamber and second bale chamber each have an entry point and an outlet, wherein the entry point of the second bale chamber is located downstream with respect to crop movement of the outlet of the first bale chamber.

9. The harvester of claim 8 further comprising:
a first serpentine system for the first bale chamber, the first serpentine system comprising:
   a second bale gate positioned in the first bale chamber, the second bale gate comprising at least one second bale gate arm and at least one second bale gate roll attached thereto; wherein the at least one second bale gate arm is mounted about a second bale gate pivot point; wherein the second bale gate is configured to exact tension on the at least one baling belt; wherein the second bale gate is configured for radial movement from a closed position to at least one open position; and wherein the radial movement facilitates bale transfer from the first bale chamber into the second bale chamber;
the at least one baling belt in operable contact with the at least one second bale gate roll, around which the at least one baling belt is capable of rotation; and
a second serpentine system for the second bale chamber, the second serpentine system comprising:
a third bale gate positioned at the outlet of the second bale chamber, the third bale gate comprising at least one third bale gate arm, at least one fixed member operably connected to the at least one third bale gate arm, and at least two movable third bale gate rollers; wherein the at least one third bale gate arm is mounted about at least two third bale gate pivot points; wherein the third bale gate is capable of radial movement from a closed position to at least one open position; and wherein the radial movement facilitates bale ejection from the second bale chamber;
wherein the at least one baling belt is in operable contact with the at least two movable third bale gate rollers.

10. The harvester of claim 9 further comprising:
a first slack adjustment system for the first bale chamber, the first slack adjustment system comprising at least one slack adjustment arm and at least one movable slack adjustment roll attached thereto; wherein the at least one movable slack adjustment roll is capable of sliding from a first position to a second position to take up or release slack in the at least one baling belt in the first serpentine system; and
a second slack adjustment system for the second bale chamber, the second slack adjustment system comprising at least one second slack adjustment arm and at least one movable second slack adjustment arm roll attached thereto; wherein the at least one movable second slack arm roll is capable of sliding from a first position to a second position to take up or release slack in the at least one baling belt in the second serpentine system.

11. The harvester of claim 9, wherein the second bale gate is operably synchronized with the transfer of a bale from the first bale chamber to the second bale chamber such that:
in the closed position the at least one second bale gate roll is in a downward first position, preventing the exit of the bale from the first bale chamber;
in a first open position of the at least one open position of the second bale gate roll, the at least one second bale gate roll is positioned upward and rearward from the downward first position, allowing the bale in the first bale chamber to transfer into the second bale chamber; and
in a second open position, the at least one roll of the second bale gate pivots downward and frontward, allowing crop material to transfer from the first bale chamber into the second bale chamber, but preventing the exit of the bale from the first bale chamber.

12. The harvester of claim 9, wherein the third bale gate is operably synchronized with the transfer of a bale from the first bale chamber to the second bale chamber such that the at least two movable third bale gate rolls slide upward prior to bale ejection from the second bale chamber.

13. The harvester of claim 9 further comprising at least a first, second, third and fourth operable conditions, wherein:
the first operable condition comprises the second bale gate in a closed position, the wrapping system in a wrapping position, and the third bale gate in a closed position, wherein the second bale gate in the closed position facilitates formation of harvested crop material into a bale, wherein the wrapping system in the wrapping position and the third bale gate in the fully closed position allows a second bale to exist in the second bale chamber;
the second operable condition comprises the second bale gate in an open position, and the wrapping system in a raised position, wherein the second bale gate in an open position, and the wrapping system in the raised position allow for bale transfer from the first bale chamber to the second bale chamber;
the third operable condition comprises the second bale gate in an open position, the wrapping system in a wrapping position, and the third bale gate in a closed position, wherein the second bale gate in the open position, the wrapping system in the wrapping position, and the third bale gate in the closed position allow for crop to be transferred through the first bale chamber, and into the second bale chamber;
the fourth operable condition comprises the wrapping system in the wrapping position and the third bale gate in an open position, wherein the wrapping system in the wrapping position and the third bale gate in the open position allow for bale evacuation from the harvester.

14. The harvester of claim 8 further comprising a conveyor system comprising:
a plurality of conveyer rolls around which the at least one baling belt is operably rotating; and
a first bale gate comprising:
   at least one conveyer arm operably connected to at least one of the plurality of conveyer rolls, the conveyer arm mounted about at least one pivot point, the at least one conveyer arm is operable to exact tension on the at least one baling belt; wherein the at least one conveyer arm is capable of radial movement from a lowered position to at least one raised position; wherein the radial movement of the first bale gate facilitates bale transfer toward the second bale chamber;
wherein the plurality of conveyer rolls comprise at least one set of movable rolls and at least one drive roll; wherein the movable conveyer rolls are movable in a forward and rearward direction; wherein the drive rolls are configured to drive movement of the at least one baling belt; and wherein the plurality of conveyer rolls are capable of exacting tension in the baling belts in conjunction with the first bale gate.

15. A method of packaging material in the harvester of claim 14, said method comprising:
   (a) feeding material from a crop feeding assembly into the first bale chamber;
   (b) forming a bale in the first bale chamber to a desired size;
   (c) transferring the partially formed bale from the first bale chamber to the second bale chamber;
   (d) completing bale formation in the second bale chamber;
   (e) ejecting the complete bale from the second bale chamber.

* * * * *